(12) United States Patent
Nilsson

(10) Patent No.: US 11,190,549 B2
(45) Date of Patent: Nov. 30, 2021

(54) METHOD AND DEVICES FOR ENABLING PORTABILITY OF DATA AND CLIENT BETWEEN CLOUD SERVICE PROVIDERS

(71) Applicant: ZEBWARE AB, Stockholm (SE)

(72) Inventor: Thomas Nilsson, Stockholm (SE)

(73) Assignee: ZEBWARE AB, Stockholm (SE)

( * ) Notice: Subject to any disclaimer, the term of this patent is extended or adjusted under 35 U.S.C. 154(b) by 0 days.

(21) Appl. No.: 16/854,246

(22) Filed: Apr. 21, 2020

(65) Prior Publication Data
US 2020/0344270 A1    Oct. 29, 2020

Related U.S. Application Data

(60) Provisional application No. 62/837,438, filed on Apr. 23, 2019.

(51) Int. Cl.
*H04L 29/06* (2006.01)
*G06F 9/455* (2018.01)
*H04L 29/08* (2006.01)

(52) U.S. Cl.
CPC .......... *H04L 63/20* (2013.01); *G06F 9/45558* (2013.01); *H04L 63/0272* (2013.01); *H04L 67/10* (2013.01)

(58) Field of Classification Search
CPC ..... H04L 63/20; H04L 63/0272; H04L 67/10; H04L 41/0806; H04L 41/12; H04L 41/0893; H04L 65/80; H04L 65/105; H04L 65/4084; H04L 67/2809; H04L 63/10; H04L 67/32
See application file for complete search history.

(56) References Cited

U.S. PATENT DOCUMENTS

2014/0280961 A1    9/2014 Martinez et al.
2015/0046557 A1*   2/2015 Rosenberg ........ H04W 12/0023
                                                709/213

FOREIGN PATENT DOCUMENTS

WO    WO 2012/100092 A2    7/2012

OTHER PUBLICATIONS

International Search Report and Written Opinion dated Sep. 21, 2020 in PCT/IB2020/000277, citing documents AA, AO and AX therein, 16 pages.
Torkura, K.A., et al., "CSBAuditor: Proactive Security Risk Analysis for Cloud Storage Broker Systems", 2018 IEEE 17th International Symposium on Network Computing and Applications (NCA), IEEE, Nov. 1, 2018, XP033459596, pp. 1-10.

* cited by examiner

*Primary Examiner* — El Hadji M Sall
(74) *Attorney, Agent, or Firm* — Oblon, McClelland, Maier & Neustadt, L.L.P.

(57) ABSTRACT

A device creates virtual storage bucket to abstract the data and the access from another device, and to secure the access using the IAM and the data using encryption and/or Mojette transform in order to generate encrypted/encoded data and transmits the data to another device. The other device saves the encrypted/encoded data for later transmitting the data to the same first device or another for decryption/decoding, securing porting of clients together with associated data in multi cloud environments.

13 Claims, 39 Drawing Sheets

060 — Multi Cloud Storage Providers

061 — Orchesto Abstraction Layer

062 — Identification and Access Management

063 — Users and Applications

```
{
  "Version": "2012-10-17",
  "Statement": [
    {
      "Sid": "Stmt1528735049406",
      "Action": [
        "s3:DeleteObject",
        "s3:GetObject",
        "s3:HeadBucket",
        "s3:ListBucket",
        "s3:ListObjects",
        "s3:PutObject"
      ],
      "Effect": "Allow",
      "Resource": "arn:aws:s3:::YOURBUCKETNAME"
    }
  ]
}
```

060 — Multi Cloud Storage Providers

061 — Orchesto Abstraction Layer

062 — Identification and Access Management

063 — Users and Applications

065

066

067

User / Application Interfaces
- API
- GUI
- CLI

Monitoring
- Metrics
- Logs

Security
- TLS
- IAM
- Policy
- AD/LDAP
- GSE
- zIDA
- Secrets and KMS

Data
- Move
- Sync
- Notification

Storage
- Filesystem
- Cloud Providers
- Overlay
- Native Format
- S3 Interface

Performance
- Cache
- zIDA (race condition)

Central
- Governance, management
- Monitoring, Logs, Alerting
- Backups, Business continuity
- Lifecycle data management
  - Security
  - Cost
  - Compliance
  - Audit artifacts (logs, conf.

Fig 6c

070 — Multi Cloud Storage Providers

071 — Orchesto Abstraction Layer

072:
- Sync | Move | Overlay
- GUI | API | CLI
- GSE | zIDA | TLS | KMS
- Notifications | Metrics | Logs
- Native Format | Cache
- Identification and Access Management | Users and Applications

Fig 7

```
package mcdf_location.authz default allow = false

-------------------------------------------------------------
# Data structures containing location info about users,buckets,resources,security.
# The JSON data could also be pulled from external
# sources like AD, Git, etc.
------------------------------------------------------------- user-location information
user_location = {
   "alice": "UK",
   "bob":   "USA"
} bucket-location information
bucket_location = {
   "supersecretbucket": "USA"
}

# Allow access to bucket in same location as user.
allow {
   input.method = "HEAD"
   is_user_in_bucket_location(input.user_info.user_id, input.bucket_info.bucket.name)
} allow {
   input.method = "GET"
} allow {
   input.method = "PUT"
   input.user_info.display_name = "Bob"
} allow {
   input.method = "DELETE"
   input.user_info.display_name = "Bob"
}

# Check if the user and the bucket being accessed belong to the same
# location.
is_user_in_bucket_location(user, bucket) {
   user_location[user] == bucket_location[bucket]
}
```

Fig 34

```
orchesto backup -r configure
enter backup_repository:"s3:server-url/bucket-name"
enter access_key for new backend:"your-access-key"
enter secret_key for new backend:"your-secret-key"
enter password for new backend:
enter password again:
created orchesto backup repository xxxxxxxx at s3:s3:server-url/bucket-name
```

```
orchesto backup /your/folder
orchesto snapshots

ID       Date                  Host       Tags       Directory
---------------------------------------------------------------
xxxxx    YYYY-MM-DD hh:mm:ss   your-host  your-tag   /your/folder
```

Fig 37

```
kubectl apply -f orchesto_prereqs.yaml
kubectl create secret generic cloud-credentials \
    --namespace <NAMESPACE> \
    --from-file cloud=credentials-orchesto
kubectl apply -f config.yaml
kubectl apply -f deployment.yaml
```

Fig 38

```
apiVersion: kubebackup.orchesto.io/v1
kind: Schedule
metadata:
  name: daily
  namespace: yyyyyyyy
spec:
  schedule: "* * * * *"
  template:
    excludedNamespaces: null
    excludedResources: null
    hooks:
      resources: null
    includeClusterResources: null
    includedNamespaces:
    - '*'
    includedResources: null
    labelSelector: null
    snapshotVolumes: true
    ttl: """h"m"s"
```

Fig 39

```
kubectl apply -f daily.yaml
```

```
kubectl -n yyyyyyyyy get snapshots.kubebackup.orchesto.io

NAME                      AGE
daily-YYYYMMDDhhmmss      **h
daily-YYYYMMDDhhmmss      **h
```

METHOD AND DEVICES FOR ENABLING PORTABILITY OF DATA AND CLIENT BETWEEN CLOUD SERVICE PROVIDERS

CROSS-REFERENCE TO RELATED APPLICATIONS

This application claims priority to U.S. Provisional Application No. 62/837,438 filed Apr. 23, 2019 and incorporated herein in its entirety by reference.

BACKGROUND

Field

The present invention generally relates to a multi-cloud gateway design based on virtualization of object storage buckets to decouple frontend data access from backend cloud storage, in combination with a Central to orchestrate multiple gateways and in particular for the use in high security data use-cases for multi-cloud data transfer over non perfect networks enabling non-disruptive data access to frontend data, during background port or synchronization of data between cloud providers, and specifically in the use for the portability of clients together with associated data in multi-cloud environments.

Description of the Related Art

Companies may use a multi-cloud strategy, which uses several different cloud providers for functions, to achieve their business objectives. Using different cloud providers' functions benefits and gives companies improved functionality to meet specific workload requirements.

Throughout the text below "client" is used in different meanings. Client is normally a connected application, but can also be a directly connected user or another connected resource. A client can also be user to represent an application and user. As used herein a resource is something connected, or to be connected, to be used as storage or to perform computations. A resource may also be another remote application, as a service, or may be accessed by other means.

As noted above companies and enterprises often choose a multi-cloud strategy due to the benefits of cloud providers having different capabilities. One such benefit is that the multi-cloud is readily available. If one cloud is offline, then the enterprise or company may still work on the other clouds and achieve its goals. Another benefit is flexibility in the sense that an enterprise or company can select the cloud most suited to fit their particular business needs, functions, economics, locations, and performance. A further significant benefit of multi-cloud adoption is that enterprises or companies can avoid vendor lock-ins.

Though multi-cloud strategy benefits are attractive, there are some weak points with existing multi-cloud strategies. One of the possible pitfalls with incorporating a multi-cloud strategy is the difficulty in achieving technical integration across the various cloud providers. Multi-cloud strategies also possess unique security vulnerabilities that require the company or enterprise to trust both the cloud storage provider (CSP) and the government of the CSP with the securing and limiting access to confidential and private data. Associated increased administration with multiple providers also increase costs and make data access more technically complex, thereby making it difficult develop multi-cloud applications.

Having multiple CSPs gives rise to a need to port clients and associated data to another CSP when costs, services or outer factors are not satisfied by a present CSP. A migration of client and data is normally considered a project and planned together with experts.

There is a great need for an improved multi-cloud functionality that reduces the complexity for using different cloud providers and securing the data and access to the data.

SUMMARY

The proposed technology provides mechanisms where a CSP can be managed over a virtual bucket (VB) and be decoupled from the backend. The VB can be used to set access and data policies again to protect the data at the backends from frontend applications and users. The credentials and policies for the access to the backend storage can then also be handled directly over the gateway (GW) having the virtual bucket over traditional directory services such as Active Directory (AD) or Lightweight Directory Access Protocol (LDAP). The VB also uses Identification and Access Management (IAM), and integrates this in the company's normal infrastructure instead of each cloud provider's own systems. The Orchesto (OC), which controls multiple GWs, enables an abstraction between data storage and the user/application and acts as a gateway for the access to cloud or on-premise data managed by enterprise directory services as Active Directory or LDAP with additional features over Orchesto such as data security, data governance, data proximity, cost, monitoring and reports/alerts.

Security for cloud data today is challenged in many ways both from criminal actions and governmental intervention. The United States has introduced the Cloud Act which allows the U.S. federal government to investigate data stored on any U.S. cloud provider's server without informing the data owner of the investigation. The value of the cloud data is also immense, making cloud storage an attractive target for criminals eager to break into a CSP. Having data security features like Zero-knowledge encryption (End-to-end Encryption) by the GW together with a data access manager that transforms data into chunks of data and then distributes these chunks to different CSP's, such as the zIDA (Zebware Information Dispersal Assistant) makes the data fully cloud safe (by trusting nobody) and prevents the data from any unauthorized external access or intrusion.

Another aspect of a Multi Cloud Data Framework (MCDF) for secure data access and portability is the requirement to deliver high performance access to data for use cases in need of maximum performance, like analytics. The built-in cache and filesystem access can be configured and automatically put in sync with the configured cloud storage providers. A topology can be designed for an optimal fit to any specific use case, having different operating systems, hardware architectures, both in cloud(s) and on premise.

MCDF should also enable simple portability between different CSPs as enterprise needs and CSP offerings change over time.

BRIEF DESCRIPTION OF THE DRAWINGS

A more complete appreciation of the MCDF and many of the attendant advantages thereof will be readily obtained as the same becomes better understood by reference to the following detailed description when considered in connection with the accompanying drawings, wherein:

FIG. 6*c* is a table sorted into categories of functions of GW and for the MCDF according to exemplary aspects of the present disclosure;

FIG. 7 illustrates a matrix showing the Multi Cloud Storage Providers layer according to exemplary aspects of the present disclosure;

FIG. 34 shows an example of a policy that can be applied to a gateway to restrict access to user with wrong geo-positioning according to exemplary aspects of the present disclosure;

FIG. 37 shows the use of the in FIG. 35 created repository for backing up folder "/your/folder" to "server-url/bucket" and then showing the created snapshot of the data in "/your/folder" according to exemplary aspects of the present disclosure;

FIG. 38 shows an illustrative example of a basic configuration of a GW intended to be used for snapshot backups on a Kubernetes platform according to exemplary aspects of the present disclosure;

FIG. 39 shows a basic configuration for the scheduling of snapshots to be performed by the GW on configured data on a Kubernetes platform according to exemplary aspects of the present disclosure;

DETAILED DESCRIPTION

Figure 1A:
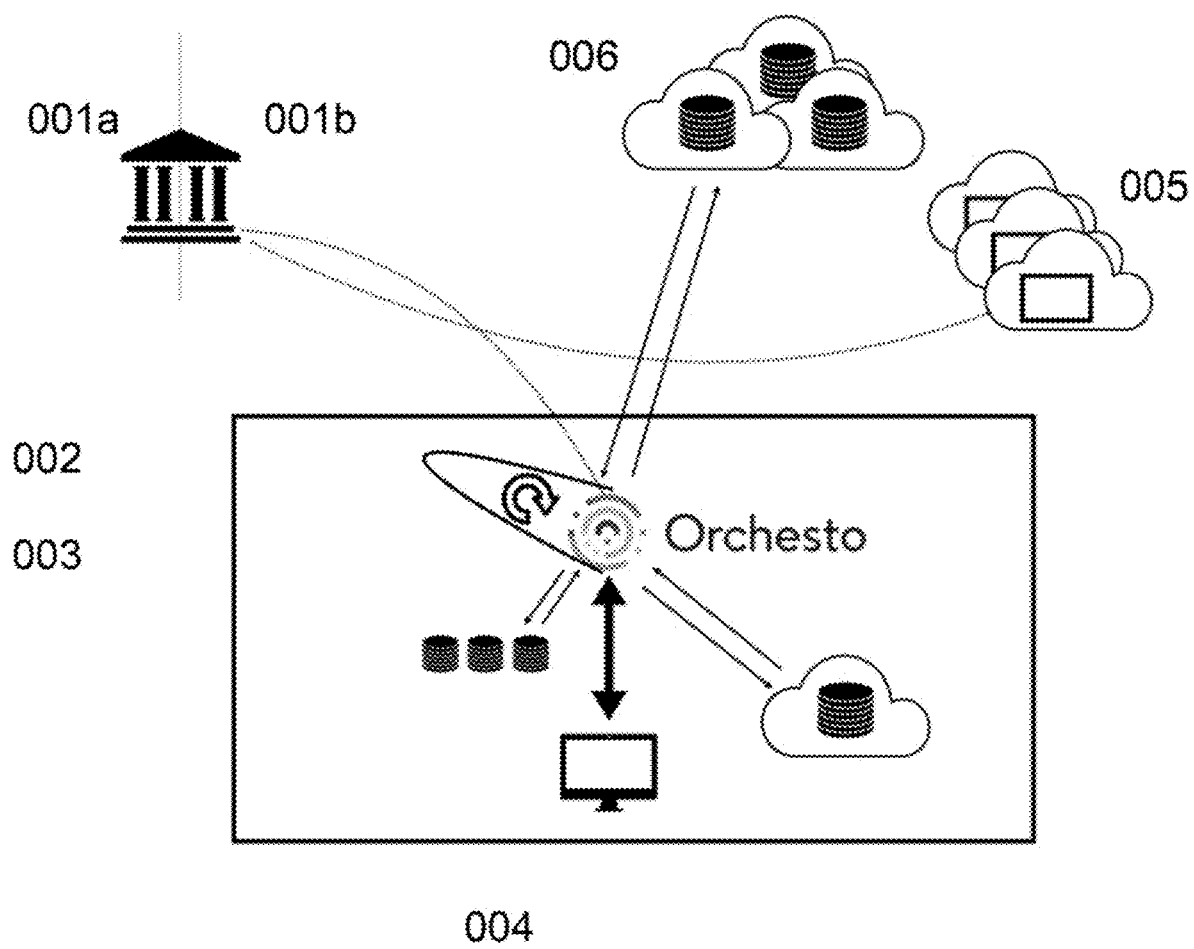
FIG. 1a is a schematic representation of the Multi Cloud Data Framework (MCDF) together with cloud storage providers and cloud storage service providers according to exemplary aspects of the present disclosure.

Referring now to the drawings, wherein like reference numerals designate identical or corresponding parts throughout the several views, the features in this disclosure are described in greater detail.

There is a great need for an improved multi-cloud data security and access to protect privileged and secret information from intruders and misuse. There is also a need to take control of access rights for enterprise cloud service accounts and fine-tune what data to allow access to for specific users without giving cloud supplier detailed user or group information. Separating the private from the public side over a gateway makes it possible for companies and groups to have company accounts by several cloud providers and to set up users that get unique private login credentials with administered and controlled access to data in specific buckets inside configured cloud provider for group or user access depending on use-case over the GW. Having a gateway with an abstraction layer between private and public and having the possibility to place this gateway (GW) close to the application or user(s) or in the cloud as a gateway worker (GWW) enables the possibility to use different clouds for specific usage patterns and features, when each cloud provider has different capabilities and specialties. Placing the data close to applications and use-cases in need of high performance, secure sensitive data, results in cost optimizations and allows for governance of the data in accordance with the governing corporate policies. The GWW is a basic configured gateway that can be assigned specific work to be carried out in an external environment using the built-in lambda function, the Amazon Web Services (AWS) server-less compute framework, functionality to run functions on server-less installations in the cloud or on any other platform having useful function. The lambda function allows code to run for virtually any type of application or backend service, without administration. Uploading the code and the lambda function takes care of everything required to run and scale. The Lambda function can also be set to be automatically triggered from other services than the GWW on data supported with secure access by the GWW or GW.

When moving application and clients workloads across a multi-cloud environment, there is a need to manage a number of things. Tools must be in place to enable easy and effective movement of the workloads across the multi-cloud environment. This means virtualization or containerization must be implemented for the workload. This can be achieved by using for example Docker, Linux Container (LXC) or Canonical Linux Container Hypervisor (LXD).

To make the workload truly portable between clouds, things need to be taken further with respect to the data. The various contextual needs of a workload need to be understood, ensuring that performance is not compromised by, for example, a transactional workload moving to a public cloud while its main data remains on the private cloud. The latencies involved with such data traffic having to traverse the wide area network (WAN) will probably outweigh any benefits gained. There is a great need for a MCDF that can seamlessly move the data in proximity with the application over different clouds while maintaining security and governance of the data. Having data and application to work together is done using storage policies in the MCDF that sets rules for performance, governance and more to define where the best location is for data is for the multi-cloud application. When the optimal data location is identified, the data can be moved without disturbance, non-disruptive, to any connected application. In the storage policies the data moved can be chosen to be copy, a move/sync of the data, or re-distribution the zIDA chunks to better meet the demands of the application or user.

Data backup and disaster recovery together with threats like ransomware makes it necessary to have proper protection on the data at all times. The importance of high availability and disaster recovery for data storage systems including the importance and principals of protecting data from disasters using backups are well established. This knowledge can also be applied onto ransomware protection, disaster recovery and other important use cases. The move to use CSP's for these backups have become more and more popular and accepted in recent years. The introduction to use a snapshot technique makes it possible to have an efficient recovery of data from a specific point in time. Having snapshots made by distributed GW's in close proximity to the clients also in cloud native topologies using a MCDF, will make backup and recovery distributed and granular, making it possible to have client with associated data portable to other locations hosting the correct resources.

Using a GW or GWW gives a company or enterprise the tools to divide data policy responsibilities for specific areas into departments having this responsibility within the company and not just the IT department. For example, security, compliance, cost management, customer application performance, cloud provider functions may be managed by different departments such as the security department, the legal department, the finance department, the sales/marketing department, and the IT department.

In FIG. 1a, the illustration of the MCDF includes two major parts: the gateway (GW) 002 and the Orchesto Central (OC) 001. Two additional parts, the Customer portal (CP) and a gateway worker (GWW), are not shown in FIG. 1a. The GWW has all features of the GW but is not dedicated to a user group but a work. The GWW is also without configuration if no work is being performed by the GWW, minimizing exposure to CSP when GWWs are placed in the cloud for direct work between different CSPs, as shown in FIG. 31d.

FIG. 1a further shows that the gateway 002 is close to the application 004 both of which are inside the 003 enclosed environment. The cloud service providers 005, which are not configured, communicate with the OC 001 over application programming interface (API). The GW 002 is connected to cloud storage providers 006 for data exchange. The OC 001 is divided into customer access 001a and administrator access 001b. Both the customer access 001a and the administrator access 001b can be configured so that actual data or more specific data for security reasons are not seen based on policies given to the OC 001. On preconfigured cloud storage providers 006 and cloud service providers 005, the OC 001 can create both new 003 enclosed environments on other cloud service providers and new storage on cloud storage providers 006 for new applications or demands set over policies. Depending on the use case and environment the enclosure 003 can be configured for High Availability (HA) or not. For desktop installations high availability is not normally a necessity but for server applications in a data center this is normally required.

Cloud data orchestration for secure data and access with portability for cloud computing environments is needed in tomorrow's future data environments. Having a multi-cloud data access that has an architected data security is important when more and more private and confidential data is stored in the cloud.

The GW is a single gateway binary for a secure safe data access over a verified standard S3 interface for multi-cloud environments to all configured cloud storage providers, having different protocols and dialects. The GW supports the standard latest Zero-knowledge encryption (End-to-end Encryption) and is enabled by the GW together with a private key management system. The zIDA (Zebware Information Dispersal Assistant) is a feature for the data to make it fully cloud safe (trust nobody) and prevents the data from any unauthorized external access or intrusion that can be used alone or in combinations with an encryption of the data.

Figure 23:
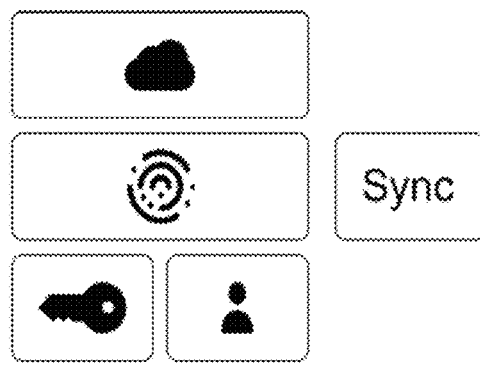
FIG. 23 illustrates the Sync as a part of the Abstraction layer according to exemplary aspects of the present disclosure.
Figure 33:
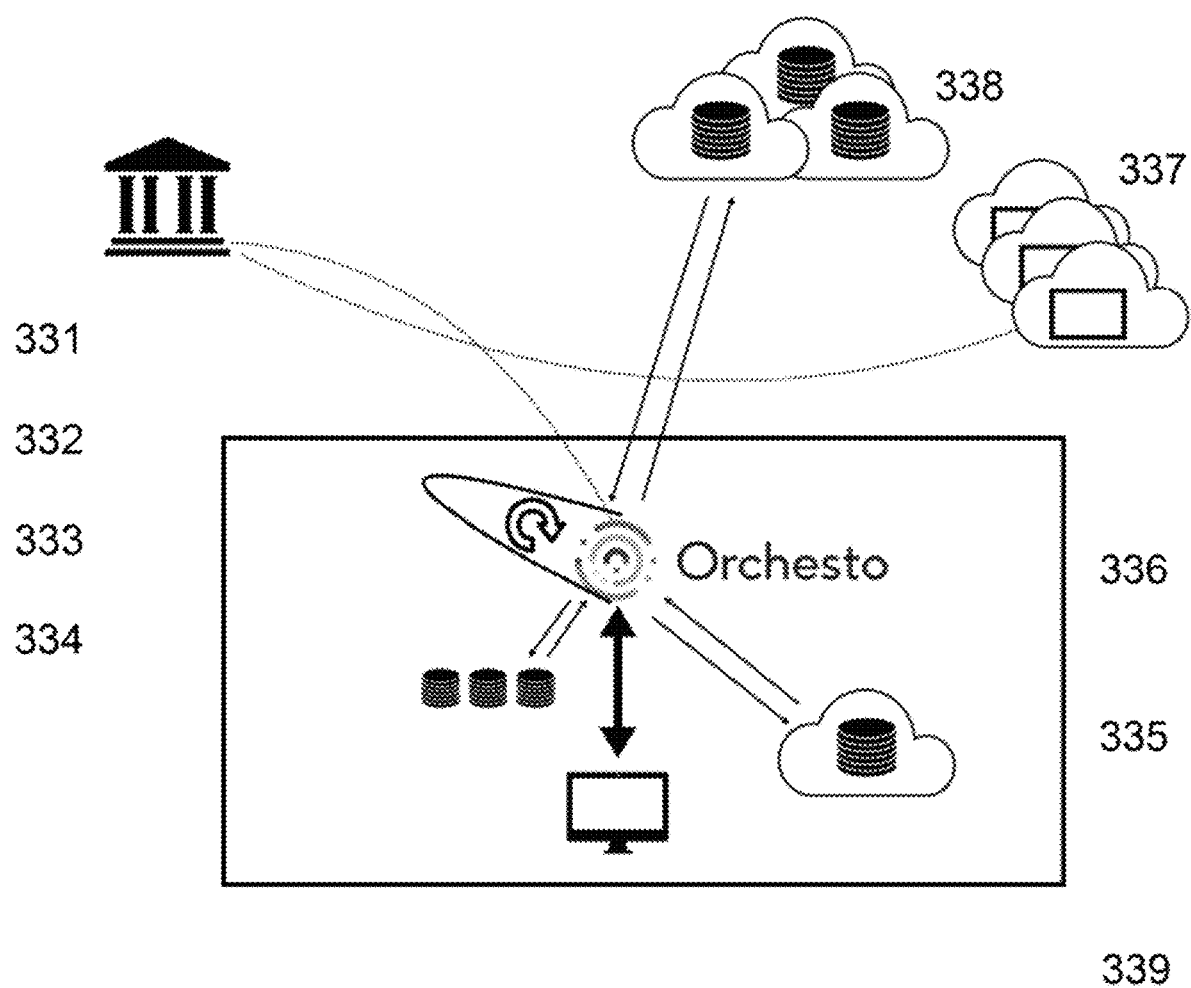
FIG. 33 shows an illustration of a topology with application in one cloud or datacenter and with data in distributed clouds using the OC for administration/management of data for connected application/role/users according to exemplary aspects of the present disclosure.

The MCDF include two main components: the GW, a single binary small footprint software, and the OC. The GW is placed between the data storage and the users/applications and the OC is used to administer and control dynamic multi-cloud configurations of multiple GWs. These two frame components will handle the in and out of data based on the given configuration up to the point when new configurations are distributed to the GW and GWW. In FIG. 33, a fully distributed application uses a GW to have parts of data in different locations than centralized in where the actual compute operation is located. In step 331 the OC is a central control of the topology running policies for what data the application 334 is configured to have for a correct operation. Over the OC 331 the GW 336 can be configured to use both an additional local cloud 335 in combination with local cache 333. The cache can be configured to perform using Mojette Transform, securing the application function and reducing redundancy. The cache can be configured to use high performance disks/block devices like non-volatile memory express (NVMe) or other novel types giving the application best possible performance and access to the data. In the "NVMe-oF-TP 8000 TCP Transport 2018.11.13-Ratified," information of how to use NVMe over transmission control protocol (TCP) network is specified. New disk technology to high performance cache also incorporates more memory like disks communicating without operating system interference for maximum performance. Communicating directly "cloud native" over fabrics to an application can attach storage or cache to an application. Multiple applications can be controlled over the OC 331 for different Cloud Service Providers 337 having data located safely in the cloud 338. Step 332 represents a synchronization step where data can be moved from within the present environment 339 being a cloud provider or a datacenter to other cloud providers 337, 338 determined by company and application rules/policies. An application example can here be for analytics to be carried out on data in company DataOwner using a specialist company DataAnalytics to have this work carried out without giving the DataAnalytics company access to more than required information located in the cloud. Data analytics in the actual data is a high performance compute operation on specific type of files. The company DataOwner identifies what data is needed for the analytics together with governance and security for this to be carried out by DataAnalytics. A set of policies are prepared in the OC 331 for giving access to the specific files for the application using IAM together with policies for roles and storage policies. When the application is high performance operation it is also decided to have a local cache step 333 close to the application step 334. To have the correct data in place before start of analytics operations the warm up of the cache is done by the synchronization operation as illustrated in FIG. 23 and step 332. Step 332 extracts the warm up information to the cache to ensure the high performance of the data access operation. In an embodiment of the present disclosure, not all data is in the cache in this topology when new data is entered into the cloud by the DataOwner company and the data is not synchronized. In this case the application step 334 connected to GW 336 will receive the data from the cloud storage provider step 338 using the overlay function described in FIG. 27 to show all data to the application step 334 as if it resides on the same storage. Once this data is accessed by the application it will be stored in the cache described in FIG. 30 for further analytics operations. The data then can be analyzed by the external user DataAnalytics in high performance served by a warmed up cache. The full configuration for the application will make it possible if this is allow by policies for the application, to move to another cloud step 337 performing the same operations as in step 339, present location of the application. Move between clouds could be based on features, costs and more and is governed by the step OC 331. If the application step 334 is virtualized in containers this move operation can be greatly simplified. The application step 334 could also be an Internet of Things (IoT) application, receiving and sending messages to the GW step 336 or in itself be an IoT device, where the application 334 performs certain tasks before sending the result to the GW step 336. The steps to use a multi-cloud could then be as described in the table below.

TABLE

Data Portability

| Step | Operations | Comments |
|---|---|---|
| 1 | Create new application instance | In step 337 create new identical instance to step 339 |
| 2 | Connect OC to new instance | Step 331 OC to connect to step 337 cloud provider |
| 3 | OC to configure new GW | New GW configuration to 337 cloud provider |
| 4 | GW connects to data | GW in 337 cloud provider connects to cloud provider 338 for data |
| 5 | GW starts syncing data | GW prepares data to be in correct place for application using move, sync, cache |
| 6 | Central receives alert from new GW | When warm-up of cache and all data movements according to policies are done the OC receives a notification/alert |
| 7 | Application move | Application step 334 can now move from instance step 339 to cloud instance step 337 having all data in place together with full GW configuration |
| 8 | Application remove | Application 334 can now be removed and instead use application in cloud step 337 |

The above table illustrates an example using containerized application to simplify the move of the compute operation. Using datacenter software like Openstack and Kubernetes this operation can be automated having OC step 331 integrated with both Openstack and Kubernetes for a move when scaling/descaling applications are distributed over a hybrid and multi-cloud environment. Both Kubernetes and Openstack have the possibility for Machine Learning (ML) and Artificial Intelligence (AI) that can be used for governing the placement of data in accordance with multiple policies. Having multiple polices may in some occasions bring conflict between one or many polices making it necessary to determine which policy should be used. If it is not possible to solve a conflict, a human interaction is necessary and a report of where the conflict is needs to be created in human readable format. ML/AI will learn where to place data for low cost and performance within specification and the best strategy for scaling out over time and will evolve when more cloud storage and cloud service providers are used in the configurations.

The MCDF will enable an abstraction between data storage and the user/application and acts as a gateway for the access to cloud or on-premise data managed by enterprise directory services as Active Directory (AD) or LDAP with additional features over the OC such as data security, data governance, data proximity, cost, monitoring, automation and reports/alerts using policies for storage, security, governance, cost, and more.

The GW creates an abstraction layer using virtual-buckets in-between the user or application and the cloud storage providers. By design the MCDF will handle non disruptive portability (move, sync) of data for users and applications enabling the optimal placement of data from a cost, performance and governance perspective between different cloud providers. For use cases in need of maximum performance, like analytics, the built-in cache and filesystem access can be configured and automatically put in sync with the configured cloud storage providers. A topology can be designed for an optimal fit to any specific use case, having different OSs, HW architectures, both in cloud and on-premise.

The OC is designed to configure, monitor, manage and control multiple GWs in a multi-cloud setup. From here data security using the build-in Gateway Side Encryption (GSE) and/or the proprietary Zebware Information Dispersal Assistant (zIDA) can be configured.

For data access IAM (Identity and Access Management), the AD or LDAP is configured for users and applications for each specific GW. Analytics for security, performance, governance and cost are built into the OC for monitoring and controlling automation of predictability and possibilities. Additional customer driven analytics on data on configured backends can be implemented over the OC.

Using policies for automation and continuous improvements of the data security, performance, governance is a very effective way of working for an organization. Different departments of the organization then can have responsibility for sets of policies or groups of policies that automatically in the OC make necessary changes or warn the OC if policies are not compatible and need to be adjusted. Steps of setting up a new GW and connecting the new GW to the OC are described in FIG. 2. In step 1, the new GW identifies itself against the OC. In step 2, the administrator configures the new GW with the first basic settings, including setting communication interface to use API or S3, and securing the communication using TLS. Following this initial configuration of the GW, the administrator may set additional requirements like Monitoring and Alerts, Topology requirements, Information about the environment such as where the GW is placed. In step 3, the full configuration information is sent from the OC and installed in the new GW.

Using a rules engine for cloud management and creating policies makes it possible to automate the management and control of security, governance, performance, costs and much more in a MCDF environment. The rules engine or policy engine automatically monitors and generates alerts together with actions if policies stipulate that the MCDF environment works within stipulated policies at all times.

A policy engine is an automator for policies and a policy is a set of rules that governs the behavior of a service. Policy-enablement (PE) empowers users to read, write, and manage these rules without specialized development or operational expertise. When the users can implement policies without recompiling the source code, then the service is PE.

Policies are essential to the long-term success of organizations because they encode important knowledge such as how to comply with legal requirements, work within technical constraints, and avoid repeating mistakes.

In an example, policies can be applied manually based on written rules or unspoken conventions but may permeate an organization's culture. Policies may also be enforced with application logic or statically configured at deploy time. PE services allow policies to be specified declaratively, updated at any time without recompiling or redeploying, and enforced automatically (which is especially valuable when decisions need to be made faster than humanly possible). They make deployments more adaptable to changing business requirements, improve the ability to discover violations and conflicts, increase the consistency of policy compliance, and mitigate the risk of human error.

A policy-enabled service is able to answer questions by comparing relevant input from its environment to policy statements written by administrators. For example, a cloud computing service could answer questions such as:

Can I add compute capacity?
In what regions can I add compute capacity?
Which instances are currently running in the wrong region?
Can I move the data to a less costly CSP?
What data is not encrypted on the CSP X?
Is it approved to store GDPR active data on CSP X?
Is the application data latency approved for CSP Y?

FIG. 34 describes a policy that will restrict a user (e.g. Alice) from accessing a bucket (USA) when the location of the bucket does not match the user's location. Multiple policies can apply to the same bucket or resource.

The MCDF basic policies to be applied to have a governed and secure multi-cloud data storage, where data is grouped into different security levels and/or tagged for identification are described in the table below.

TABLE

| IAM + Storage policies | |
| --- | --- |
| Policy group | Policy |
| IAM-Identification | User and Group |
| | Other (application, machine, service . . .) |
| IAM-Access | User and Group |
| | Role |
| Storage | Security |
| | Governance |
| | Other (cost, geo-location, performance . . .) |

Figures 1B, 1C:
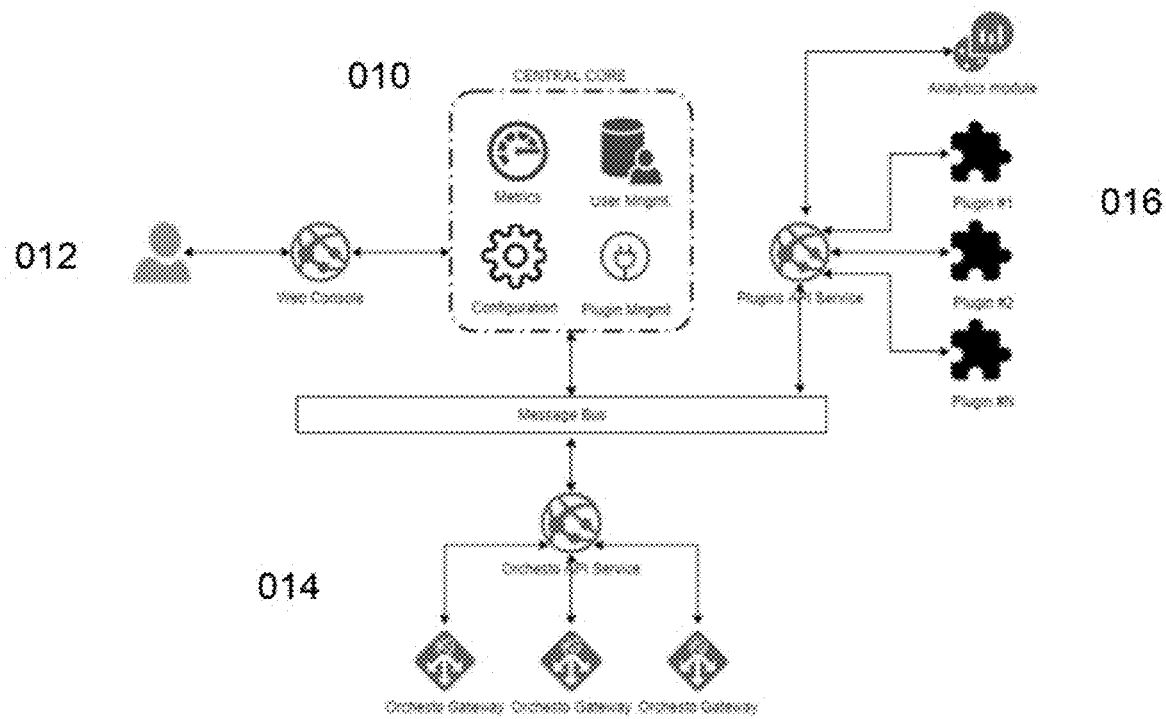
FIG. 1*b* is a schematic representation of the MCDF Orchesto (OC) for the control of multiple GWs according to exemplary aspects of the present disclosure.
FIG. 1*c* is an example of a storage policy for accessing a bucket at a CSP according to exemplary aspects of the present disclosure.

FIG. 1b shows an overview of the design of the central having a central core 010, a user interface 012, an Application programming interface (API) service to the connected gateways 014, and a plug-in service 016. The OC core simplifies the management of multiple GWs and makes it possible to configure groups of GWs connected to a specific application or individual GWs with a specific setting and demand for performance, security, governance or other aspect concerning the data and/or placement of data. The OC handles the configuration of the GWs for users and applications using Identification and Access Management (IAM), Policy generation, Monitoring including alerts and warnings and Metrics. The OC may also use a rules engine framework to automate actions based on policies to secure that the configured multi cloud data security framework works in accordance with all stipulated policies. In the OC resources are configured to be used by the GW's. Examples of resources are CSP's storage and compute nodes but can also be services both local and in the cloud in different forms that can then be configured in the OC to be used by the GW's in the cluster.

FIG. 1c describes a basic LAM configuration that allows or denies a user to access a specific bucket with specific actions allowed. The IAM configuration is set by an administrator of the OC and with privileges to the specified GW. This configuration of access can be specified to allow only access to specific files inside the bucket or only read not write depending on a specific use case and the company storage policies for governance of their data over time and for access by employees.

Figure 1D:
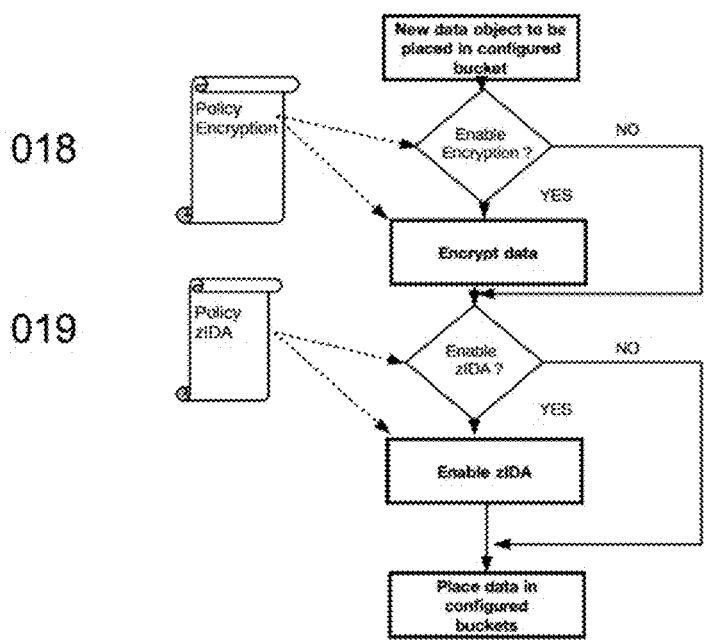
FIG. 1*d* is an algorithmic flowchart for the configuration of the data security governed by data security policies for Gateway Side Encryption (GSE) and zIDA according to exemplary aspects of the present disclosure.

In FIG. 1d, a flow diagram illustrates a simple policy for securing data using GSE and zIDA alone or in combinations for selected data. Using data governance policies the users can group data into different security classes, and this information then can be transferred into a policy that automates these policies for data security. Step 018 shows the policy for encryption and first sets the answer to the question to determine whether encryption is enabled. The next answer from the policy is how to encrypt the data, with what algorithm and other configuration inputs. In step 019 the same question as for encryption is answered for zIDA using the Policy for zIDA to determine whether zIDA is enabled and how to configure zIDA for the Mojette Transform of the data. Next, the policy sends information for how to place the data in configured buckets. These two policies can then be a combination of two or more basic policies. For example the Storage policy for security gives security "medium security" for this specific data and the IT department has specified the "medium security" to having a specific configuration and selection of possible backend CSPs. The financial department then could have third policy affecting this by giving a "storage cost" policy for the possible backend CSPs.

Figure 2:
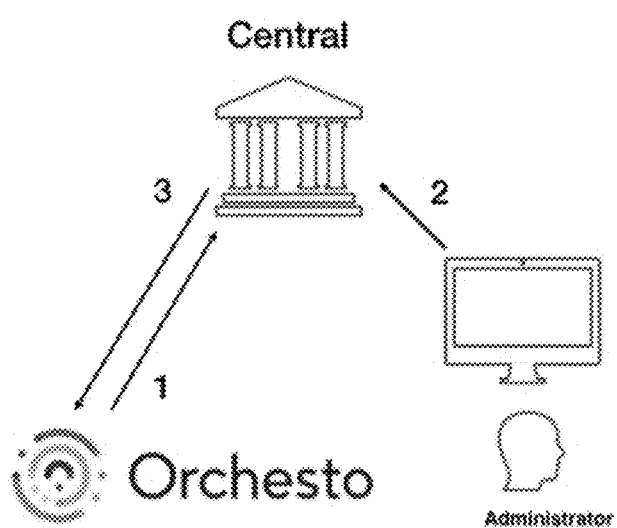
FIG. 2 illustrates an automatics notes to the OC of a new installed GW and joining the new GW according to exemplary aspects of the present disclosure.

FIG. 2 shows the design of a new configuration of a GW to the OC where the GW in step 1 sends an identification signal to the OC, the OC then shows this to the administrator for verification in step 2 and if the identification information is verified the administrator configures the GW. The configuration may include bringing a new GW into a group of GWs together with basic IAM configuration for initial verification tests sent in step 3.

The topology is important to design for a specific use case having GWs and GWW to handle the correct tasks according to the governance policies. In a preferred topology design GWWs are set up in each cloud that will be used for functions. The GWW supports compute functionality where an application uses the cloud providers' software, services and functions to work on the data. Each GWW can then be used as the data owner's gateway for IAM and Data access to each cloud provider and allow tasks as move of data or synchronization of data to take place between clouds and not over the actual user or application.

Figure 3:
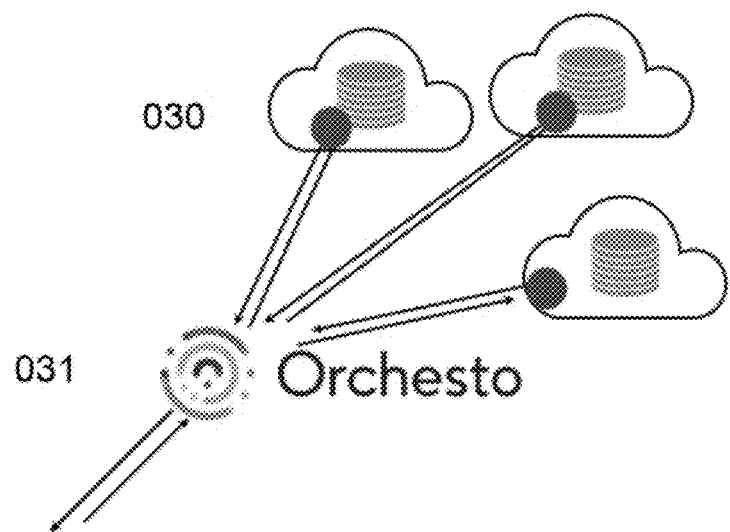
FIG. 3 is an illustration of additional GW workers in each cloud according to exemplary aspects of the present disclosure.

FIG. 3 shows a topology where GWWs 030 have been placed inside each cloud storage provider that is configured and an application close to the GW can communicate with each GWW. This topology makes it possible to place files from the application in different clouds where a specific cloud provider has specific functions, but not in the other clouds when company governance policies stipulate that specific documents are not approved to be placed in all clouds. government regulations, such as the General Data Protection Regulation (GDPR) may also limit companies' flexibility to use any cloud for data connected to a specific person and may establish a right to be forgotten for individuals. This topology also gives all cloud providers standardized capabilities possible to use with the same tools that industry is used without the necessity to adjust for each cloud providers specific differences. One code interface using S3 031 will not see any difference between each cloud provider and there is no need for code change. Using MCDF as in FIG. 1a separating data access 001a and 001b to be for an example the data owner giving permissions to a Managed Multi-Cloud Provider MMCP, where the MMCP default has no permissions to see any data, separates the GDPR responsibilities between the two parties. MMCP and Data owner can sign a separate agreement for how to comply with GDPR and similar regulations, where data owner gives access to sensitive data. A MMCP can perform many different task on the MCDF infrastructure without accessing any private information, having only basic access permissions, and test run new topologies and functions before placing actual live data into the new configuration.

Figure 4:
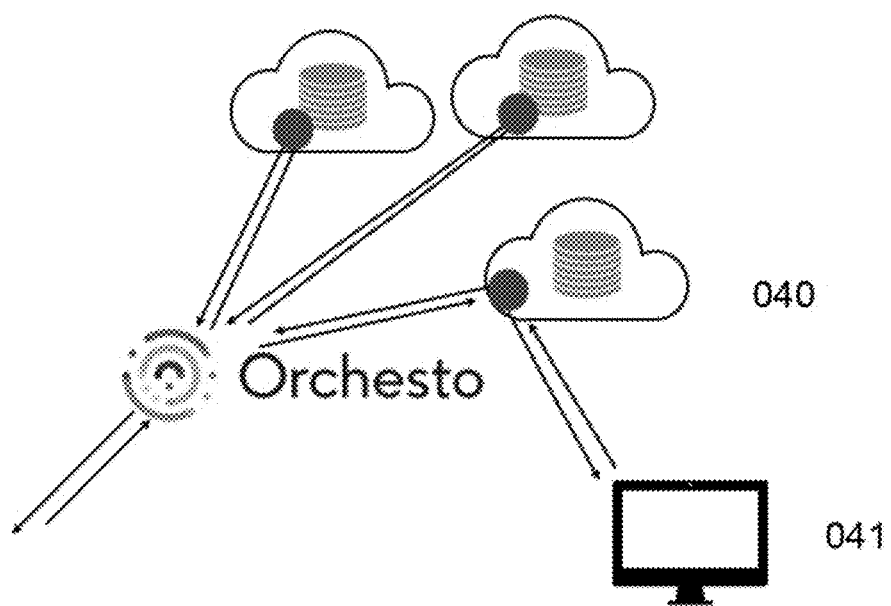
FIG. 4 is an illustration of a topology having one GW worker with an application directly connected according to exemplary aspects of the present disclosure.

In FIG. 4 two different applications are configured and working into the GW worker 040 where the external application could be an external consultant doing work on specific data and getting only very limited access over the GWW to the actual data. Access to the data can be configured over the OC in Command Line Interface (CLI) or over the Graphical User Interface (GUI) of the GWW.

Figure 5:
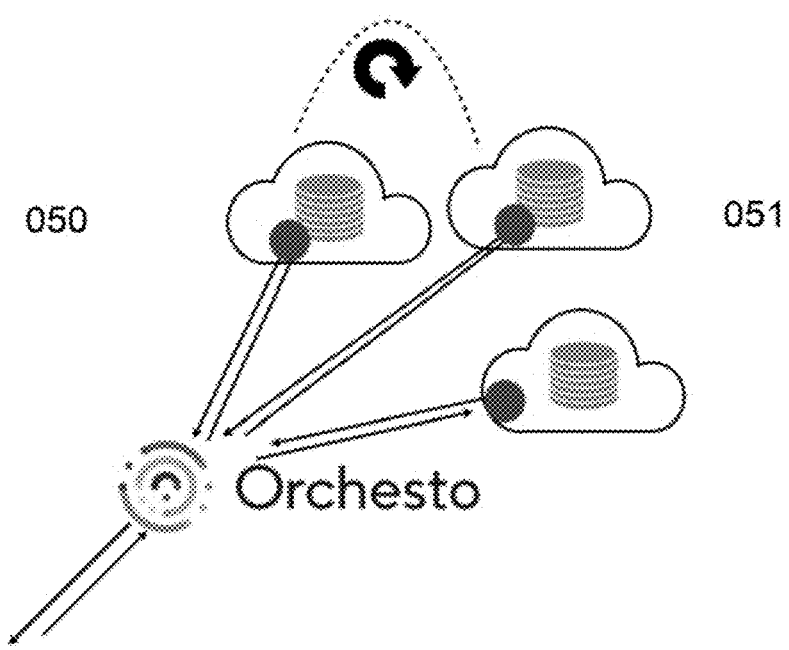
FIG. 5 illustrates a sync operation over two GW workers between two backend CSPs according to exemplary aspects of the present disclosure.

Move and synchronization of data are two very common tasks to be performed that will be simple and secure to perform with the use of the MCDF. In FIG. 5, moving or synchronization of data between two different cloud providers is shown. Moving data from CSP X step 050 to CSP Y 051 is performed using the GWW 050 for sending the data and the GWW 051 for receiving the data. The monitoring and control of the operations can be done over the OC, GUI or CLI and can be automated. Initiation of the move sync job can be done over the API in an industrial setup, but also from external software to the OC or over API.

Figures 6A, 6B:
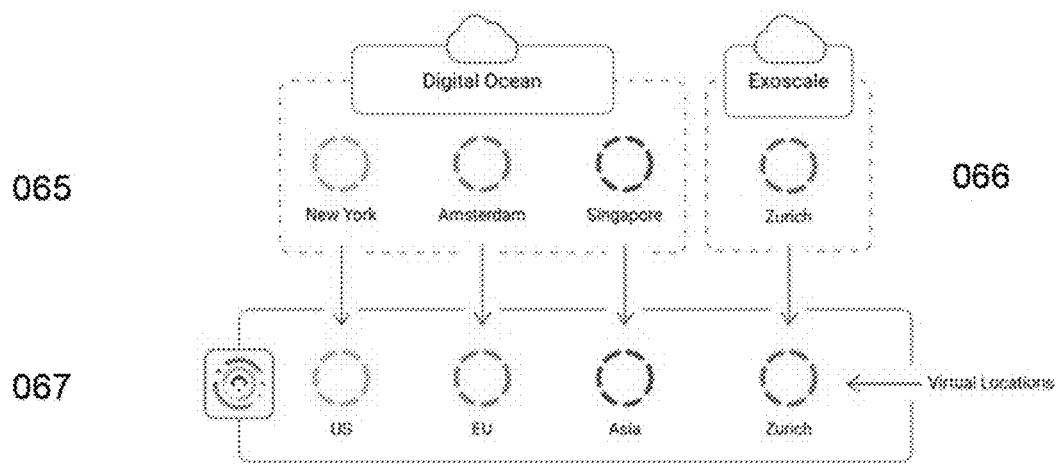
FIG. 6*a* a matrix showing the general design of a gateway according to exemplary aspects of the present disclosure.
FIG. 6*b* illustrates virtual buckets in the abstraction layer of the MCDF according to exemplary aspects of the present disclosure.

The general design of the MCDF is shown in FIG. 6 with the Multi Cloud Providers access layer 060 on the top enabling the possibility to connect to multiple cloud storage providers. The next layer is the GW functions inside the GW abstraction layer 061. The bottom layer includes the Identification and Access Management IAM 062 and the Users and Applications 063. Using a separation or abstraction between the external and the internal over virtual buckets makes the MCDF possible to use as a gateway for the lower layers 062, 063 to be used as an interface for users at the company backends without giving out user or application information to the CSP. In FIG. 6b these virtual buckets 067 are shown when connected to two different cloud providers 065, 066 where each virtual bucket in this example is given a new identification name making it simple for an application to understand the intended usage of the data. In this example, the US, EU, and Asia are included for geo-positioning of the data. FIG. 6c further divides GW and OC functions into groups and categories that could serve as a base for how to delegate responsibility for specific group of functions in a company, project or other use-case.

The Multi Cloud Storage Providers layer step 070 in FIG. 7 shows that the MCDF can be used not only to connect to external cloud providers 071 but also internal storage like 072 Ceph and Openstack Swift used in today's data centers. As a result, an administrator that uses both a local cloud and CSPs providers makes the MCDF extremely flexible and creates a new security layer that can be configured over standard enterprise software such as Active directory (AD) and LDAP. Having a hybrid storage multi-cloud setup as in FIG. 7 using both the on-premise storage and cloud storage providers makes it possible to fine-tune data governance and have the best of all platforms.

The abstraction layer over virtual buckets is the internal of the GW that makes compute operations non-disruptive to the users and applications. This separation between private layer and the external (public) with the abstraction layer in between also creates the basis for having a secure data transfer between private and public environments. This feature is often called gateway and well known in networking where a Local Area Network (LAN) is separated from the Wide Area Network (WAN) for security reasons. From a design viewpoint the MCDF also has similarities with hypervisors that are designed to create virtual environments for the installation of software, compute operation. The MCDF, by having this over virtual-bucket design, makes it possible in the same manner as for hypervisors move and change without disrupting the connected users and applications.

Figure 8:
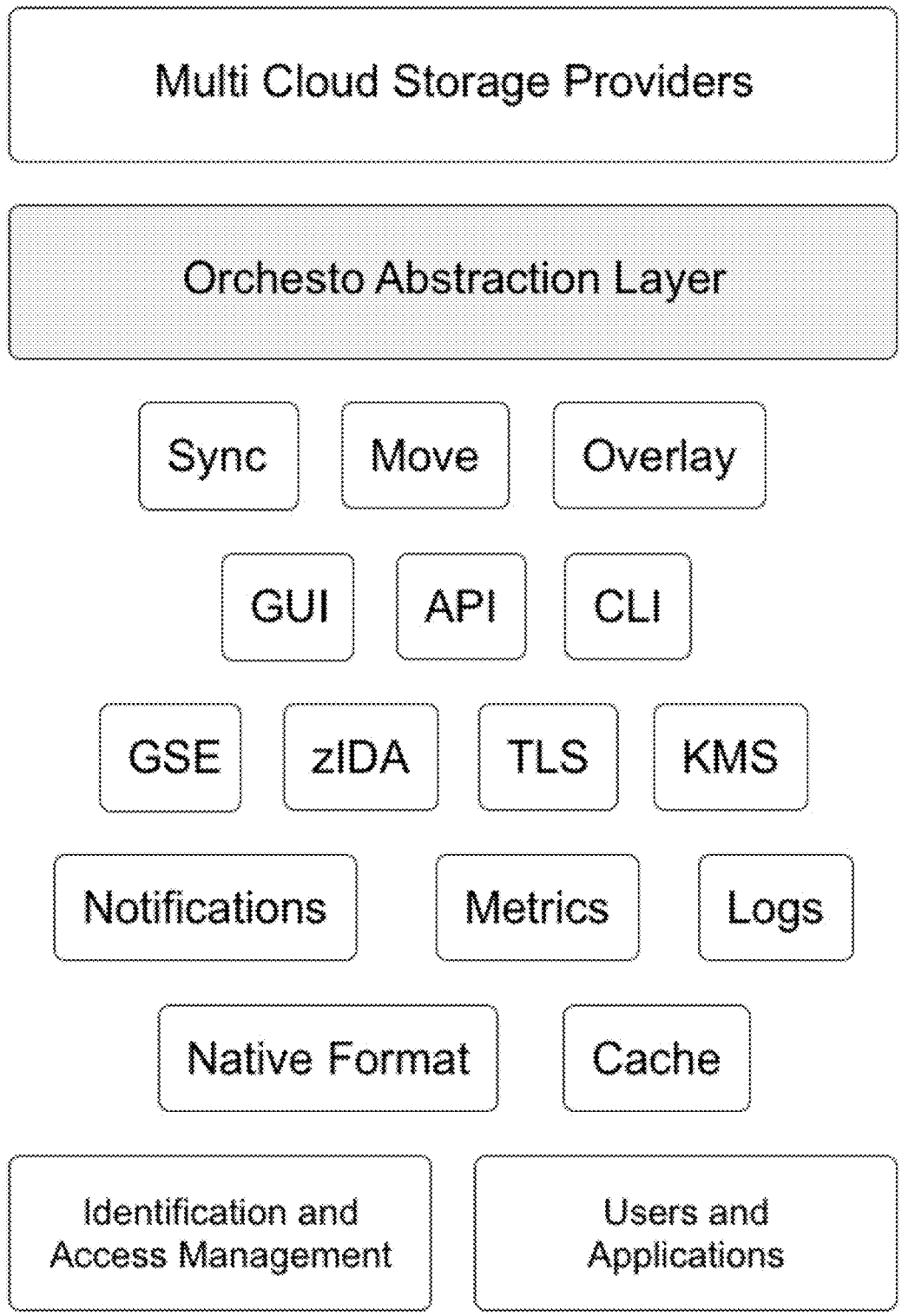
FIG. 8 illustrates a matrix showing details of the Abstraction layer in the GW according to exemplary aspects of the present disclosure.

In FIG. 8 the abstraction layer is shown with functions within the areas of Security, Data Operations, Performance, Communication and Information. In the following figures each function will be described as apart of the MCDF.

Figure 9:
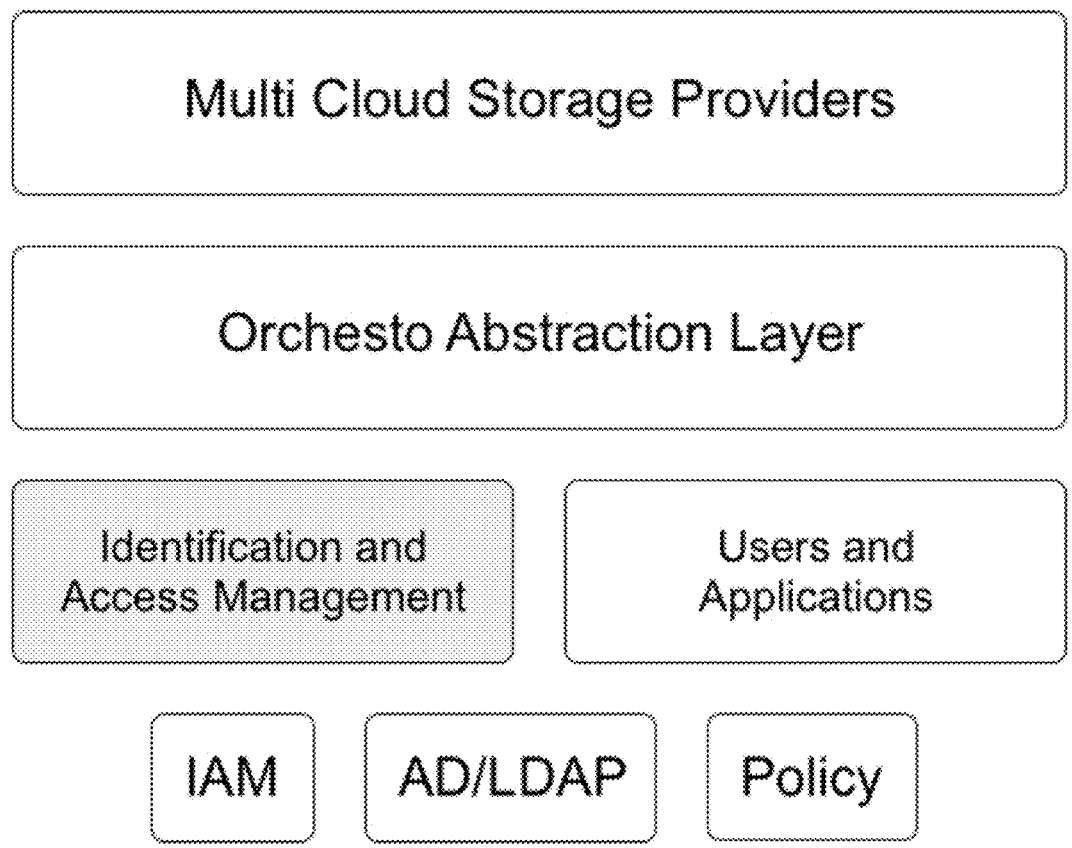
FIG. 9 illustrates a matrix showing details of the Identification and Access Management layer in the GW according to exemplary aspects of the present disclosure.

FIG. 9 shows the IAM layer for Security with respect to access and permissions for users and applications. AD/LDAP is the block for connecting to standard directory applications like Active Directory (AD) or LDAP. Policy is the block for bucket and user policies to grant access to correct information and block everything else.

Figure 10:
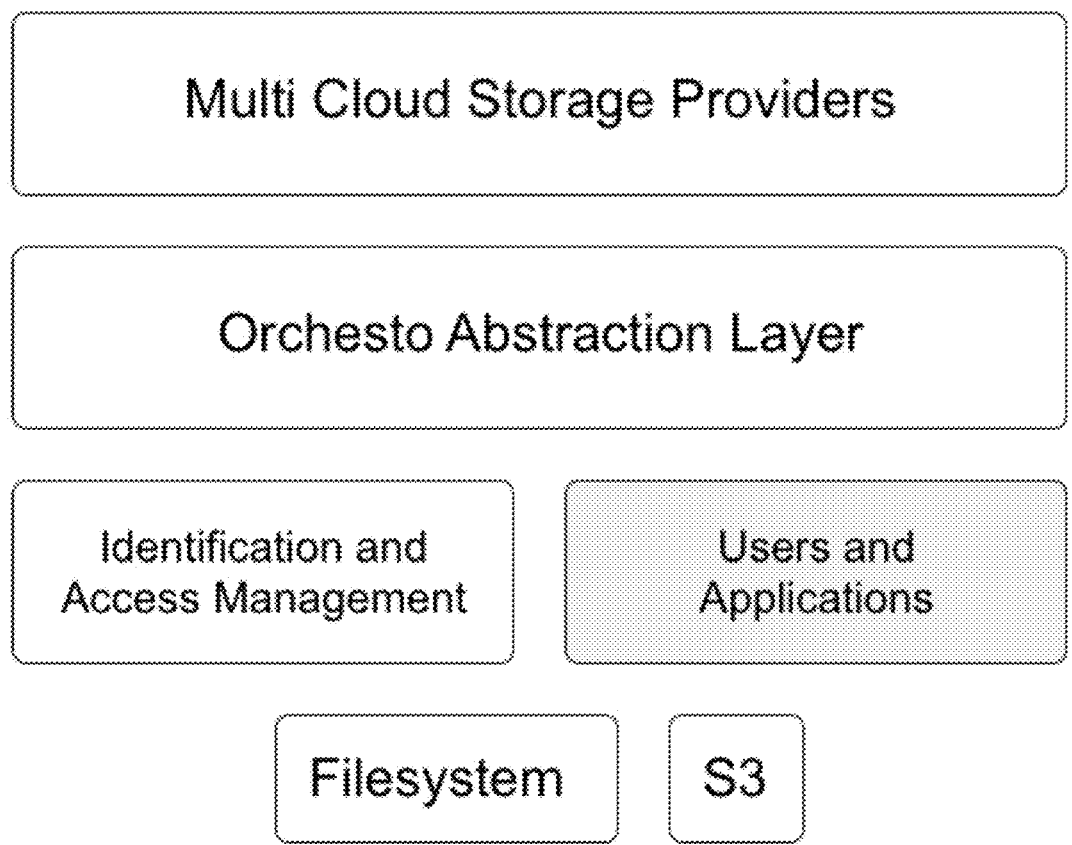
FIG. 10 illustrates a matrix showing the details of the Users and Applications layer in the GW according to exemplary aspects of the present disclosure.

Multi-cloud is a young technology and lacks standardization for on-premise installations. The communication interface is an important feature for storage and the Simple Storage Service S3 is based on the success of AWS as it has become the today's standard for cloud storage communication. In FIG. 10 the S3 interface is shown together with the Filesystem.

Figure 11:
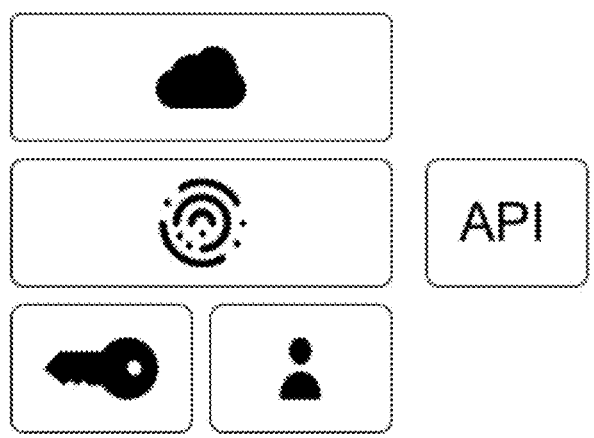
FIG. 11 illustrates the API as a part of the Abstraction layer according to exemplary aspects of the present disclosure.

FIG. 11 shows that the API block, which is part of the communication functions, communicates with other applications. The API is a simple way for any developer to integrate application interface with the MCDF.

Figure 12A:
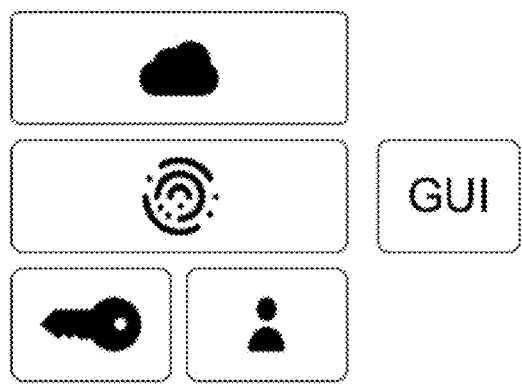
FIG. 12*a* illustrates the GUI as a part of the Abstraction layer according to exemplary aspects of the present disclosure.
Figure 12B:
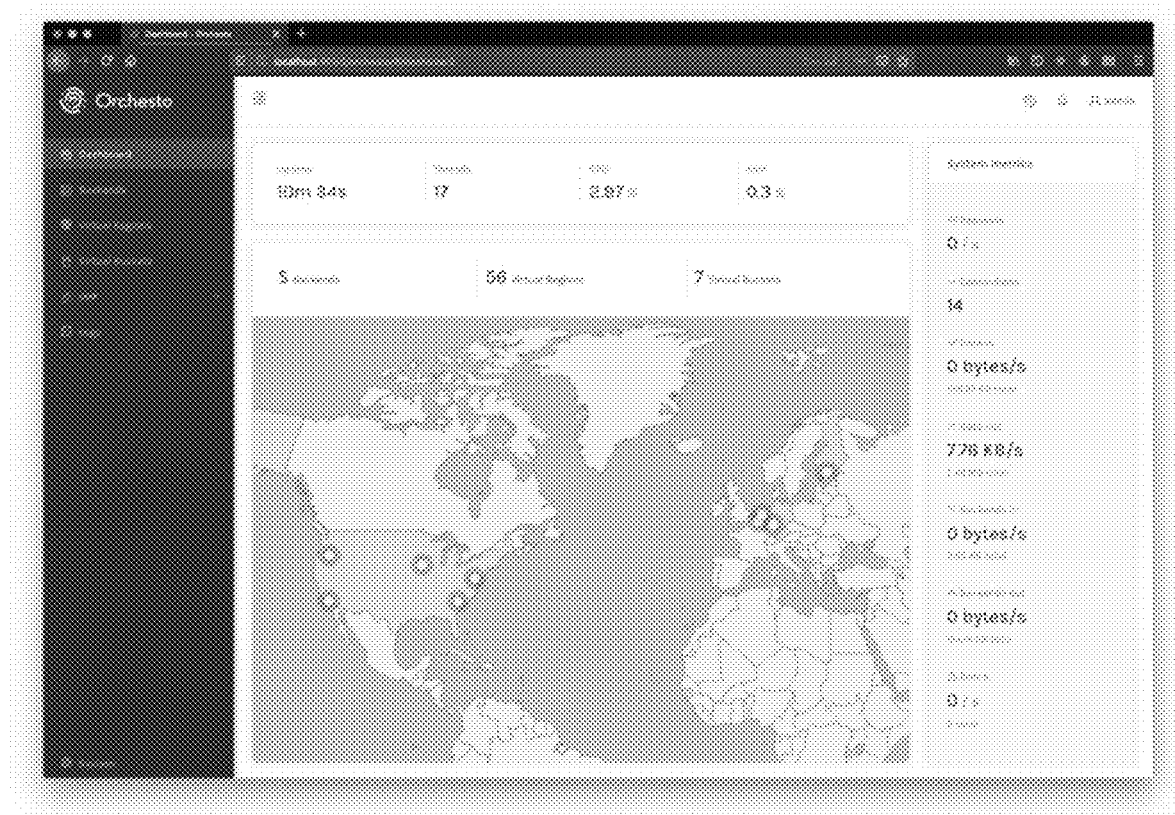
FIG. 12*b* shows the GUI representation of the dashboard with CSPs in the US and the EU according to exemplary aspects of the present disclosure.
Figure 13:
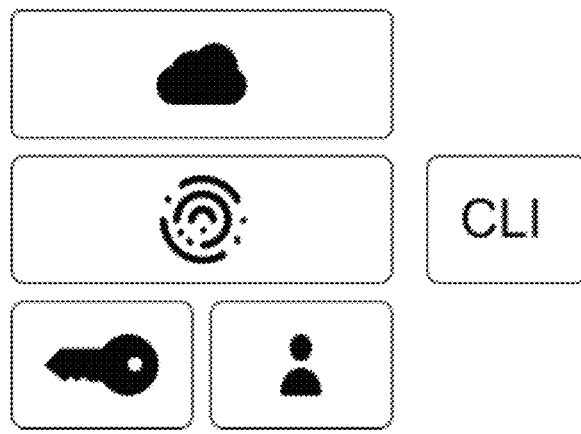
FIG. 13 illustrates the CLI as a part of the Abstraction layer according to exemplary aspects of the present disclosure.

The MCDF also makes it simple for very small installations to use the GUI and CLI for the configuration. In FIGS. 12a and 12b, the communication block using the GUI is shown and in FIG. 13 the communication CLI is illustrated.

Figure 16:
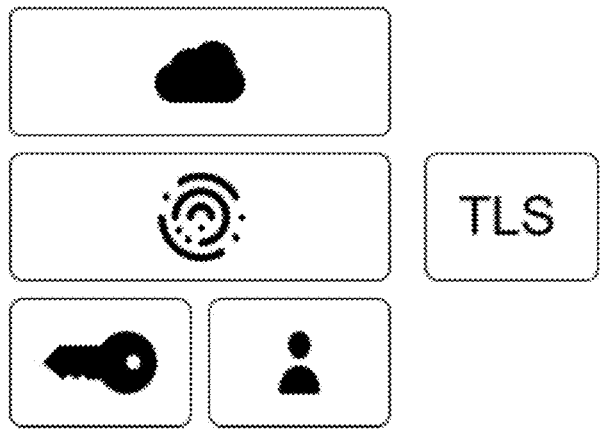
FIG. 16 illustrates the TLS as a part of the Abstraction layer according to exemplary aspects of the present disclosure.

FIG. 16 shows a security function Transport Layer Security (TLS) for the network communication.

Figure 14:
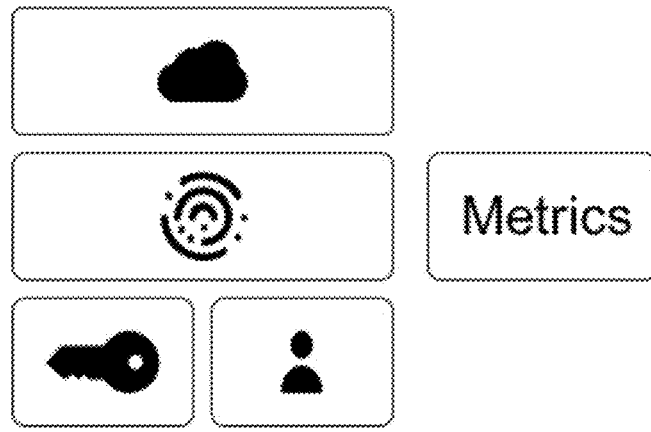
FIG. 14 illustrates the Metrics as a part of the Abstraction layer according to exemplary aspects of the present disclosure.

FIG. 14 shows the function for metrics giving information about measurements from the gateway to the GUI, CLI, API and the OC for information about gateway metrics or computer hardware metrics together with application close metrics to identify if users have an application running at an early stage.

Figure 15:
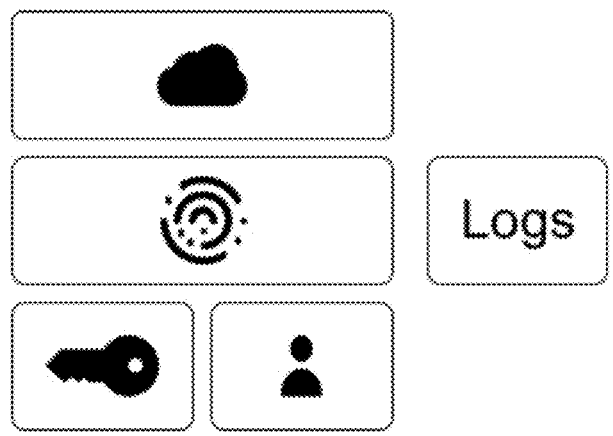
FIG. 15 illustrates the Logs as a part of the Abstraction layer according to exemplary aspects of the present disclosure.

FIG. 15 describes that logs are added to the information about what happens in the specific gateway. Errors and misuse can be detected before they become a problem. Analytics on logs is possible to perform in the OC for single or groups of GWs to determine based on policies running in auto mode or administrator decisions if a manual override is necessary to be executed.

Figure 17A:
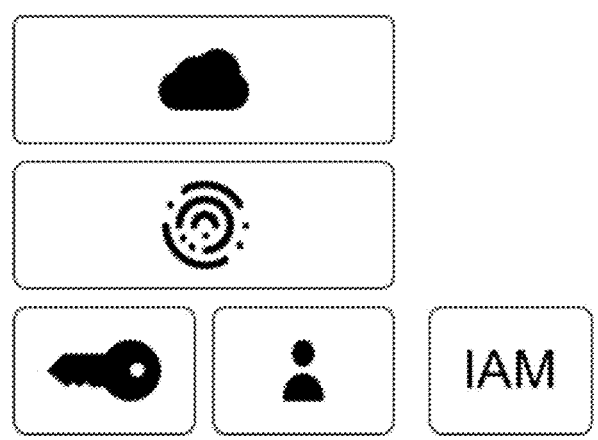
FIG. 17*a* illustrates the IAM as a part of the Identification and Access Management layer according to exemplary aspects of the present disclosure.
Figure 17B:
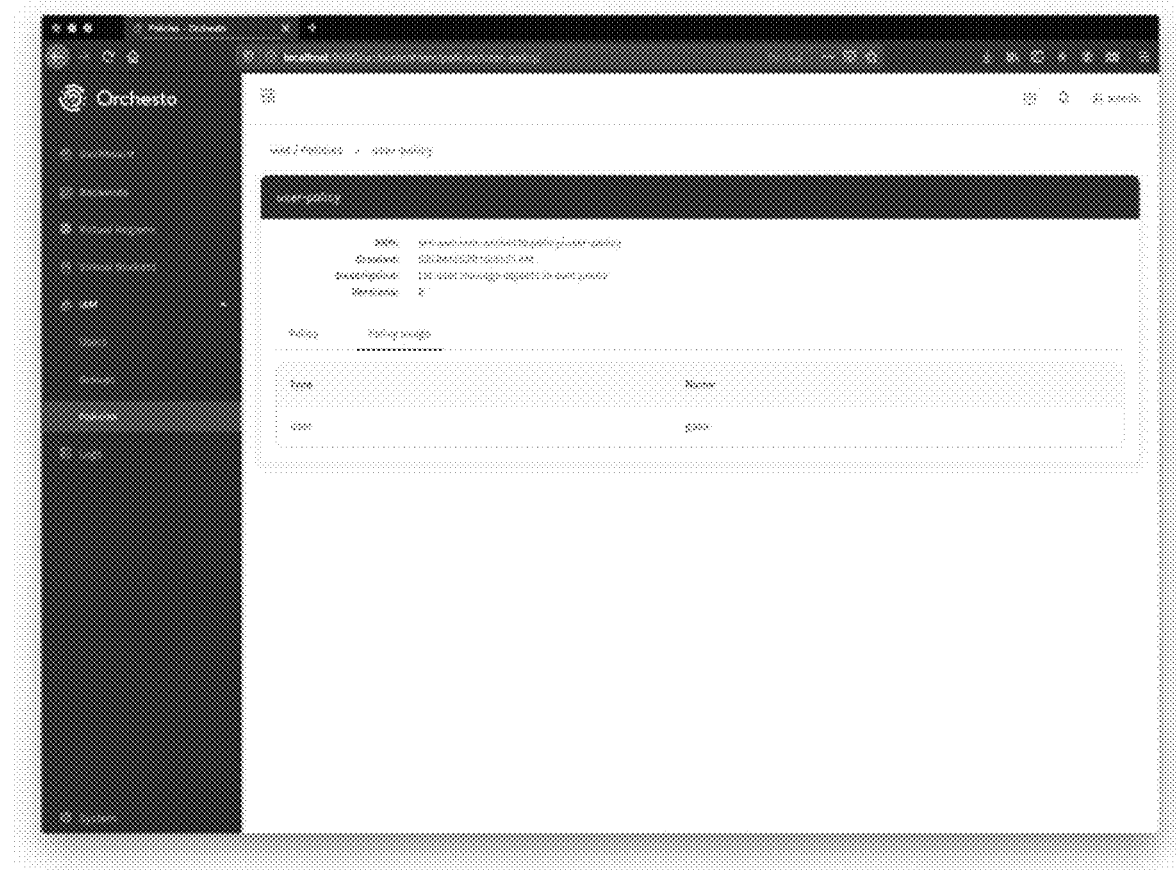
FIG. 17*b* is a GUI of the IAM layer showing the User configuration according to exemplary aspects of the present disclosure.
Figure 17C:
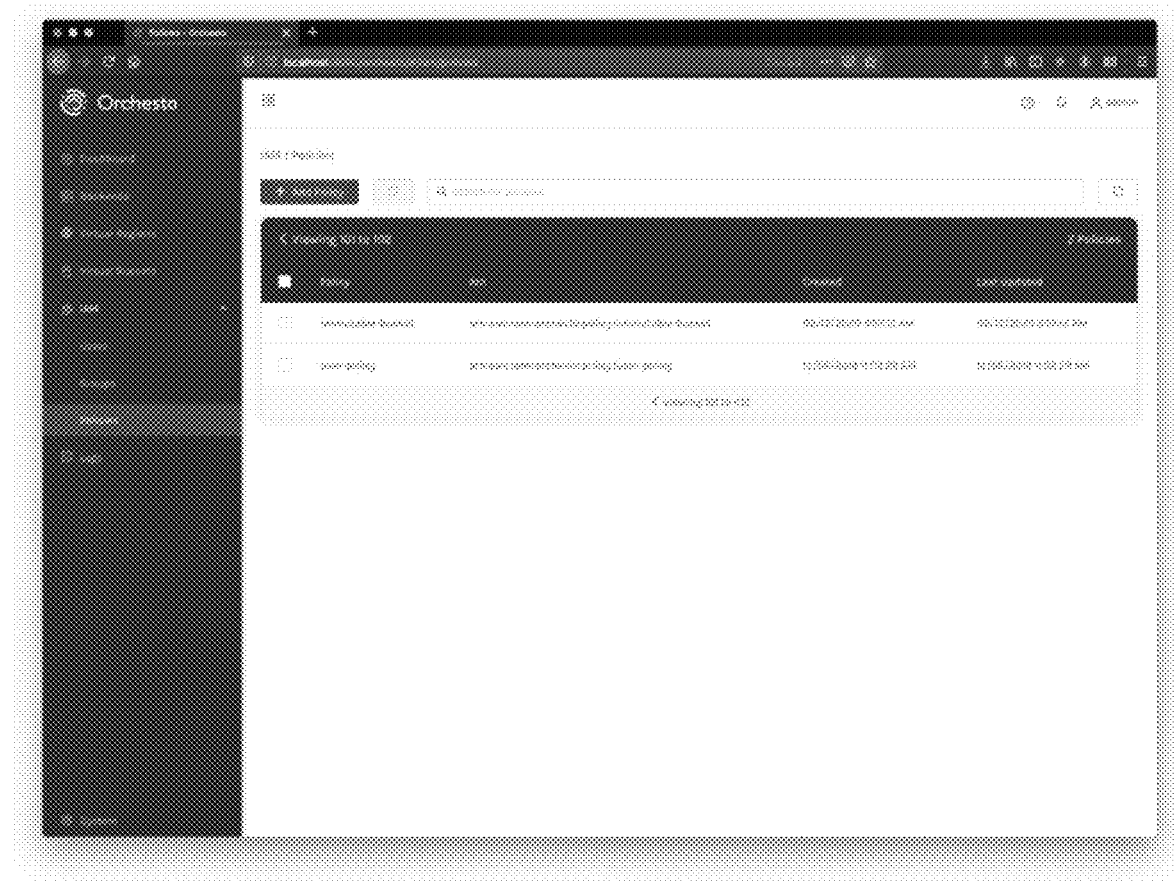
FIG. 17*c* is a GUI of the IAM layer showing the Policies configuration using an existing policy according to exemplary aspects of the present disclosure.
Figure 17D:
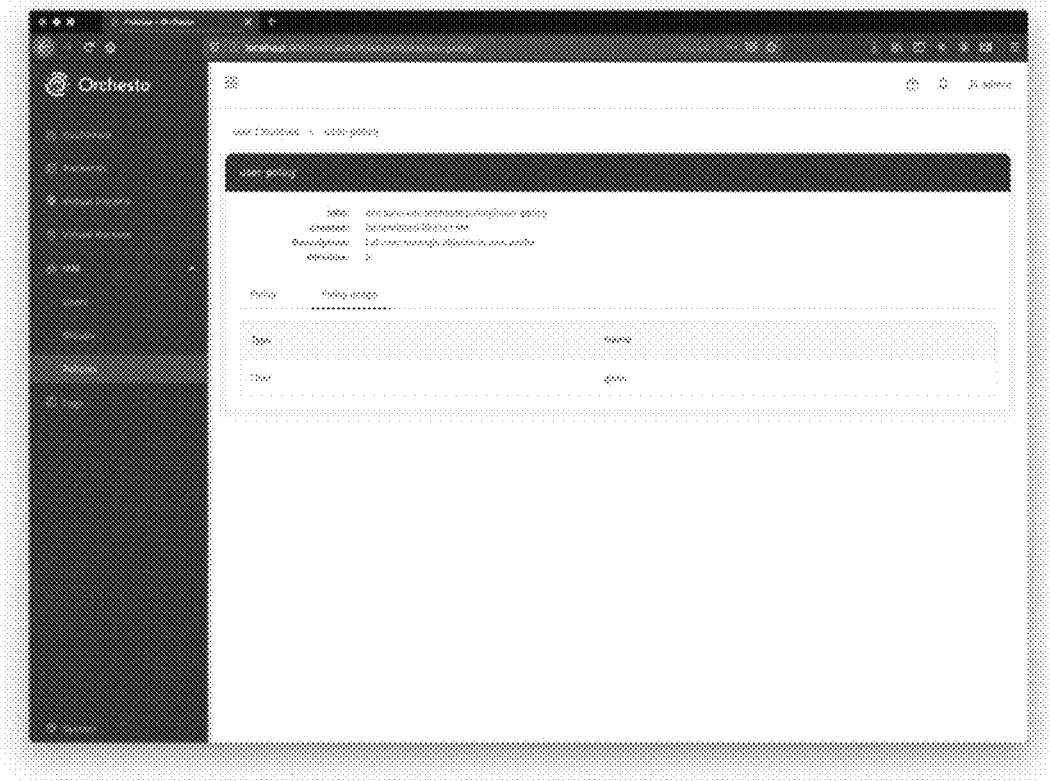
FIG. 17*d* is a GUI of the IAM layer showing the Policies configuration creating a new policy according to exemplary aspects of the present disclosure.
Figure 17E:
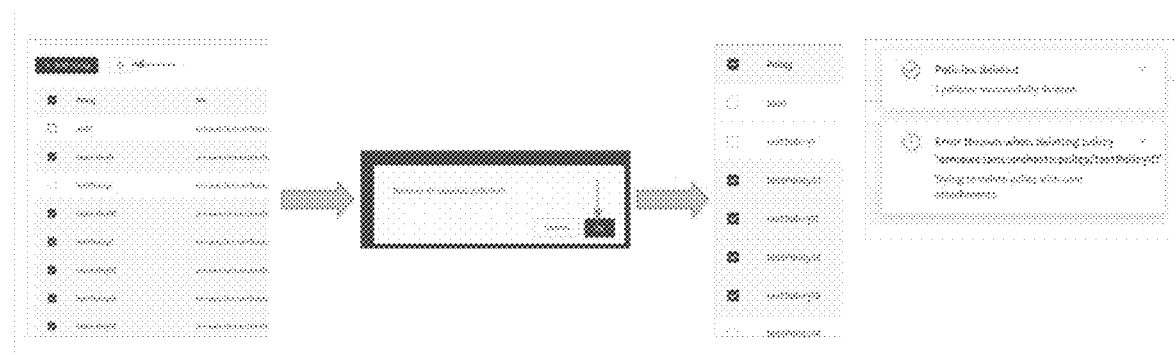
FIG. 17*e* is a GUI of the IAM layer showing the Policies configuration deleting a policy according to exemplary aspects of the present disclosure.

FIG. 17a shows the Identification and Access Management block that secures user and application access. Nothing can be accessed without passing IAM when it is in a default deny mode. The IAM requires a policy that allows access before letting anything through. FIG. 17b, c, d, e further shows the configuration of the IAM for users/groups together with policies in the GUI mode in the GW. In FIG. 17b using the GUI and configuring users the GW creates identities and a secure password for the configured user. Using the GUI in FIG. 17.c for setting a policy for the user selecting the correct one from list of templates and editing it to meet company policies. In FIG. 17d the new policy for the created user is set and then in FIG. 17e the old policy is confirmed deleted.

Figure 18:
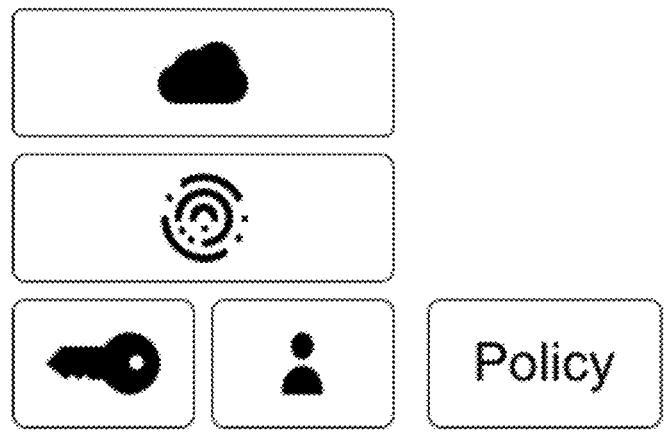
FIG. 18 illustrates the Policy as a part of the Identification and Access Management layer according to exemplary aspects of the present disclosure.

FIG. 18 is a policy block where policies for buckets and users and applications can be fine-tuned to meet company or government requirements for data governance.

Figure 19:
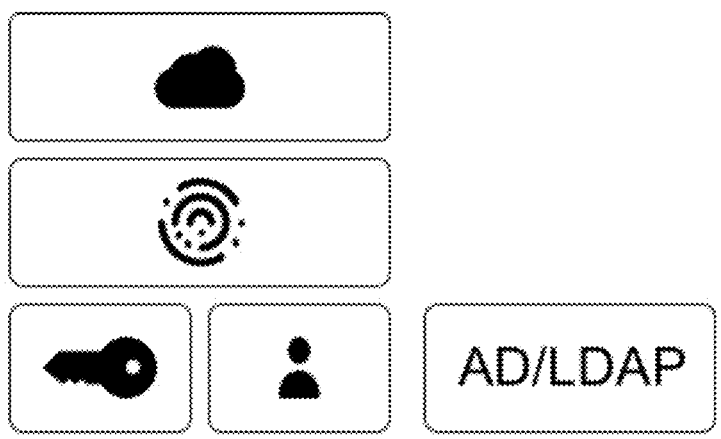
FIG. 19 illustrates the AD/LDAP as a part of the Identification and Access Management layer according to exemplary aspects of the present disclosure.
Figure 20A:
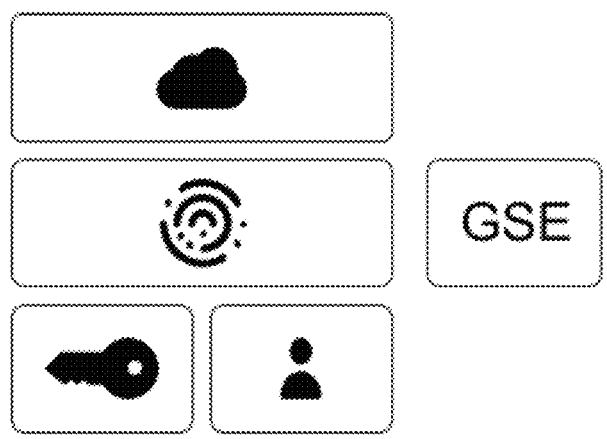
FIG. 20*a* illustrates the GSE as a part of the Abstraction layer according to exemplary aspects of the present disclosure.
Figure 20B:
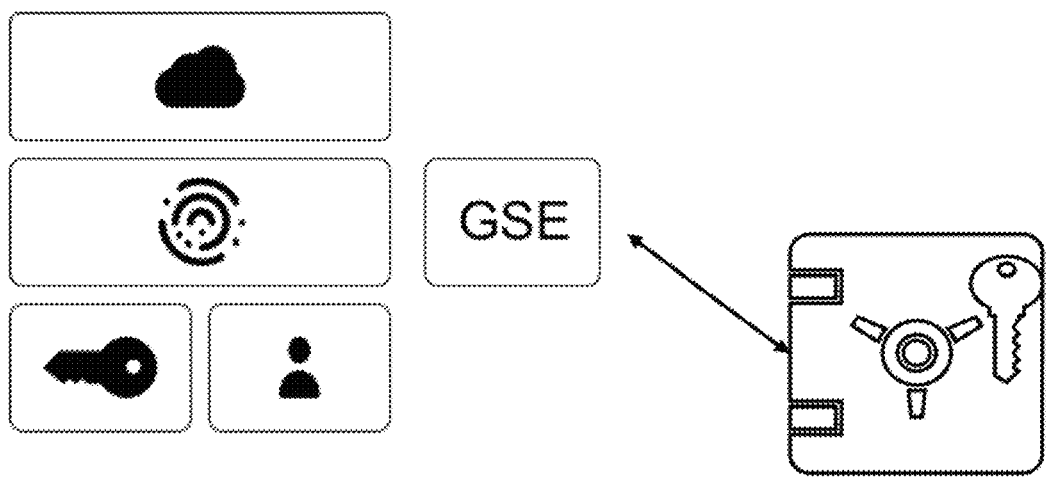
FIG. 20*b* illustrates a key management system that stores the privet keys away from the CSP according to exemplary aspects of the present disclosure.
Figure 20C:
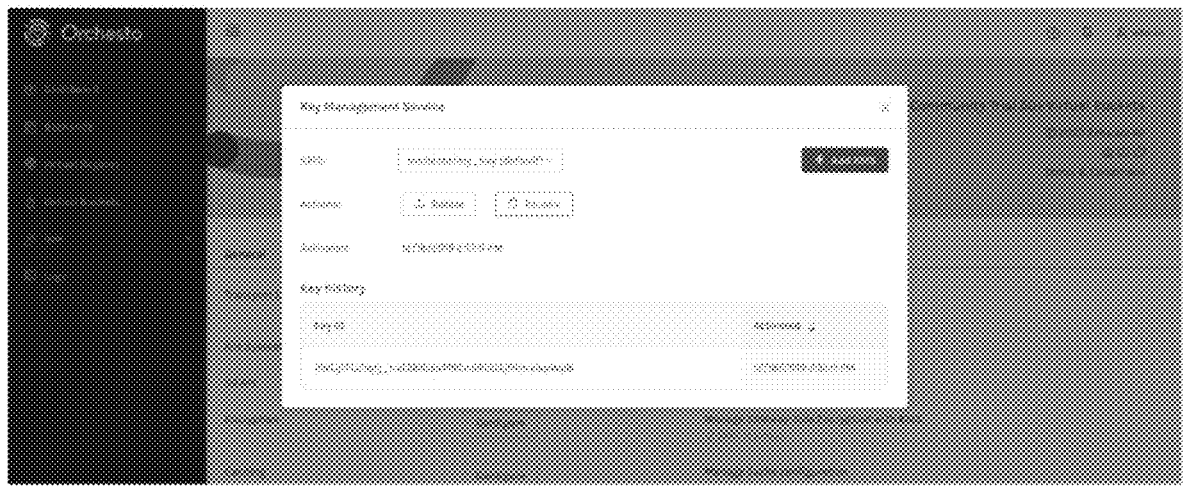
FIG. 20*c* is a GUI for the enabling of GSE according to exemplary aspects of the present disclosure.
Figure 20D:
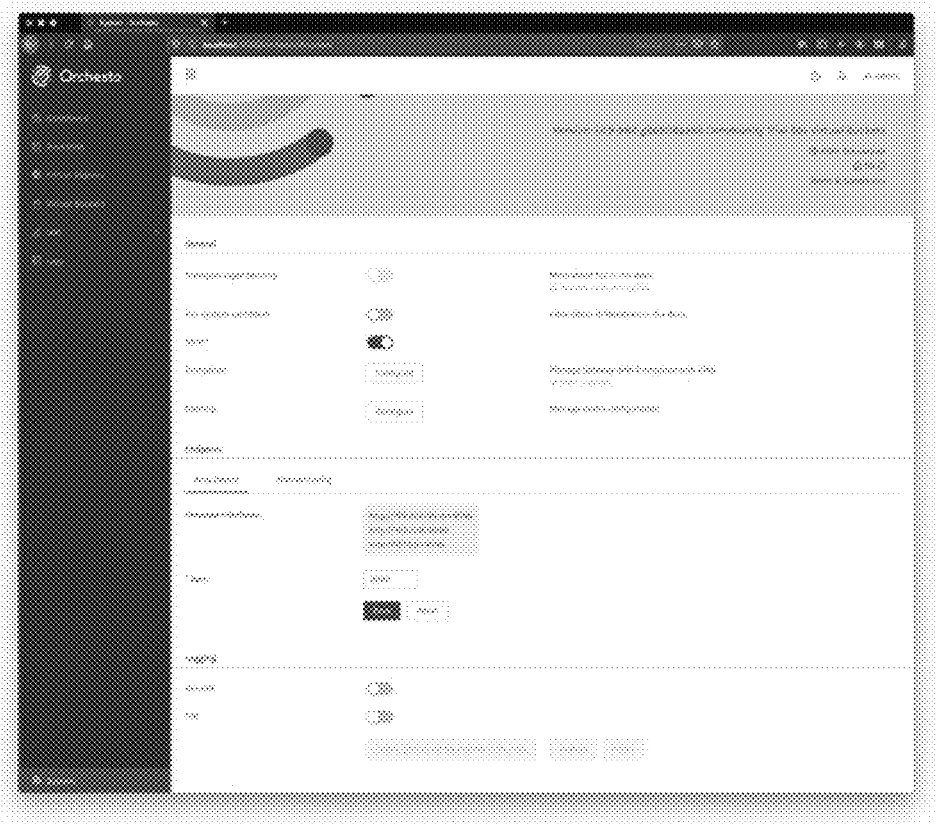
FIG. 20*d* is a GUI configuration for a master key to be used for the GSE according to exemplary aspects of the present disclosure.
Figure 20E:
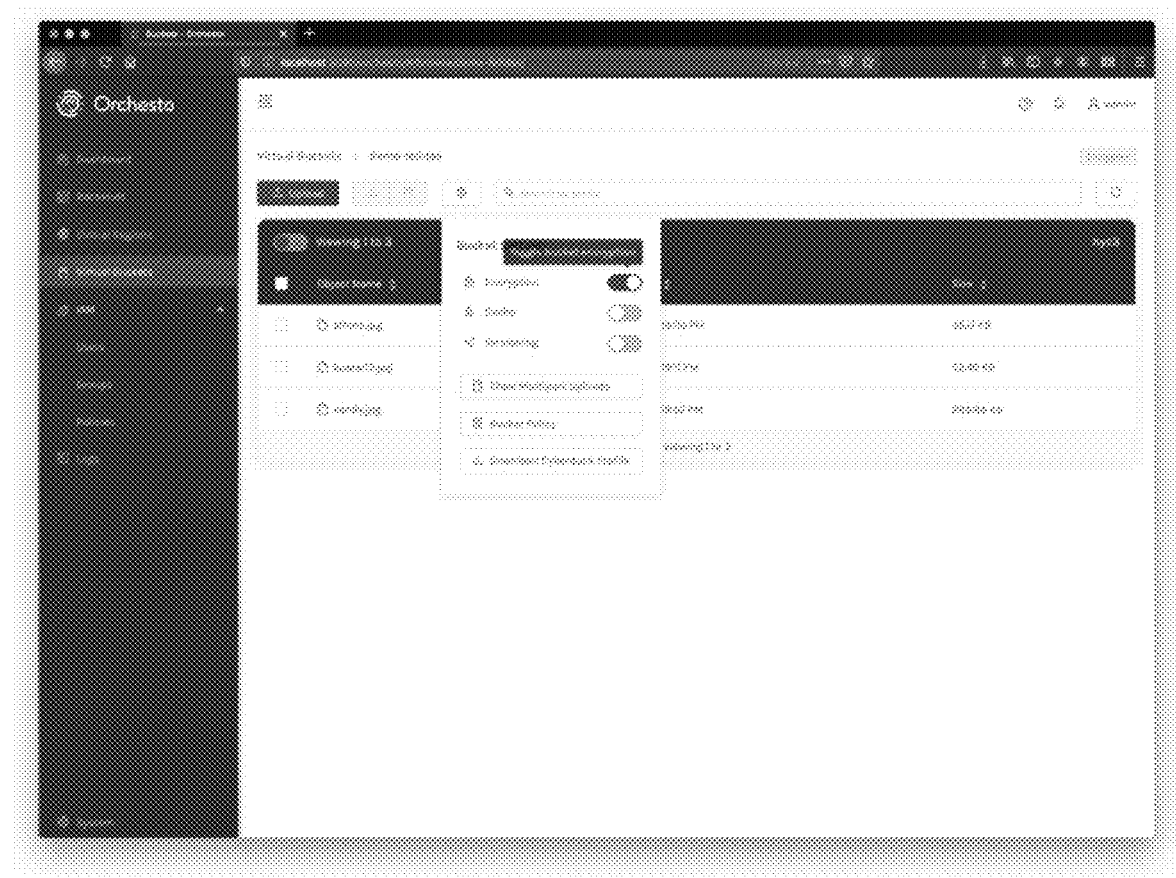
FIG. 20*e* is a GUI showing how to enable GSE for specific bucket according to exemplary aspects of the present disclosure.

FIG. 19 describes an AD/LDAP block for connecting to the enterprise Active Directory and LDAP for information about users and resources. The AD/LDAP block may be connected to a AD/LDAP server to get identities for users and resources with given permissions.

Data classified as confidential for reasons of regulatory compliance or corporate secrecy must be protected. As confidential information that is currently managed within internal systems increasingly moves to the cloud, it must be protected with the same diligence.

Moving data to the cloud does not remove any requirements for confidentiality and data protection. The loss of control of data outside the secured corporate perimeter increases the complexity of protecting data and increases the risk of compromise. There is a great need for improved functionality to protect the data in the cloud that the MCDFs solve or mitigate not only for single cloud operators but for multi-cloud operations.

Encryption is the standard to protect information from non authorized access and protect the data if a beach occurs. It is, ultimately, the obligation of the enterprise to protect its data, wherever and however it is processed. This is why the Cloud Security Alliance (CSA), in its "Security Guidance for Critical Areas of Focus in Cloud Computing", recommends that sensitive data should be:

Encrypted for data privacy with approved algorithms and long, random keys;
Encrypted before it passes from the enterprise to the cloud provider; and
Should remain encrypted in transit, at rest, and in use. The cloud provider and its staff should never have access to decryption keys.

The data should remain encrypted up to the moment of use and that both the decryption keys and the decrypted versions of the data should be available in the clear only within a protected transient memory space and the processing does not write copies of the clear text sensitive data to any logs or other persistent records.

Protecting and securing the data in a multi-cloud configuration can be carried out in the following steps given from information in the guidance "Security Guidance for Critical Areas of Focus in Cloud Computing.v3.0" from Cloud Security Alliance and also the guidance paper "Security Guidance v4" from the same organization. The first step is to control what data goes into the cloud and where and protects and manages the data in the cloud using the following methods including access controls; encryption and zIDA; architecture; monitoring/alerting; and additional controls, including those related to the specific product/service/platform of your cloud provider, data loss prevention, and enterprise rights management.

The second step is to enforce information lifecycle management security, including managing data location/residency, ensuring compliance, including audit artifacts (logs, configurations), and backups and business continuity.

Controlling what data goes into the cloud and where from an access control is done using the Identity and Access Management IAM block where the identity of the user is detected and verified. If the identity of the user is verified, the user is given specified access to the data. This block is shown in FIG. 17 and the complementary Policy block FIG. 18 and for interacting with enterprise directory server for the identification of the user or application using the AD/LDAP shown in FIG. 19.

Protecting and managing the data in the cloud using an encryption or zIDA security is shown in FIG. 20 and FIG. 21. Selected or all data can be encrypted and the keys for the encryption stored using the build-in private key management system are shown in FIG. 20b. The private key management system does not to share anything (share nothing) with the CSP, thus keeping all keys private and confidential. Different encryption algorithms can be used in different situations depending on security levels. Also, special commercial algorithms are available for high security use cases. There is an ongoing race between encryption and software together with compute operations to break the encryption. When more and more compute operations can be used in parallel using Graphics Processing Unit (GPU) cores together with Central Processing Unit (CPU) cores this race makes encrypted files need a re-encryption within a certain timeframe and this timeframe becomes shorter and shorter. A data life cycle governance from also a security perspective to maintain the security over time at the correct level. FIGS. 20c, d, e, describe pictures from the GUI showing a configuration of encryption of bucket on a specific CSP. Specifically, FIG. 20c describes the enabling of the encryption function and specifying a configuration. FIG. 20d describes the configuration and selection of key to be used for the encryption. FIG. 20e describes the enabling of encryption for a bucket.

Figure 21A:
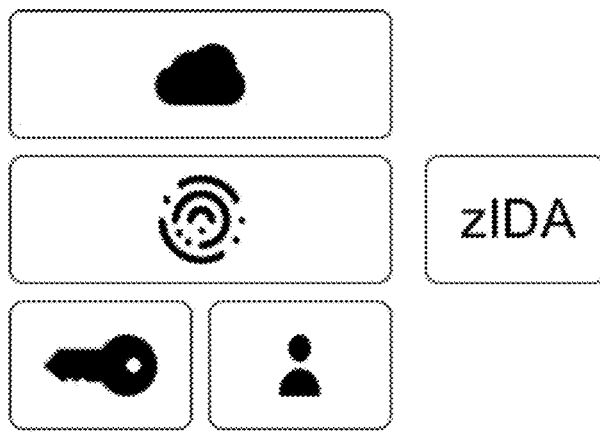
FIG. 21*a* illustrates the zIDA as a part of the Abstraction layer according to exemplary aspects of the present disclosure.

If instead using zIDA FIG. 21a describes the information dispersal agent together with encryption or there is no need for the re-encryption when the object is dispersed into a number of secured parts and spread onto multiple cloud providers, making it impossible to obtain the message without the minimum number of parts to rebuild the object. If the first step the "controlling what data goes into the cloud and where" is established and not all part in the same cloud provider, an intrusion may break into several cloud providers at the same time to obtain the minimum number of parts of the object to make it possible to start any decoding activity to take place.

Different information dispersal algorithms can be used to create a zIDA functionality. For example, the Mojette Transform (MT) is a discrete and exact version of the random Mojette Transform. The Mojette transform is by nature a non-systematic code and the parity chunks have a larger size $(1+\varepsilon)$ than corresponding systematic chunks (k), where epsilon is $\varepsilon > 0$ making the parity chunks (m) containing more information than data chunks. The Mojette Transform FIG. 21d is by design highly performant also on CPU's without advanced acceleration features and deliver excellent results even on less potent CPUs, but take full advantage of modern CPUs features when present. The MT is also portable between different hardware platforms which means that it will now be possible to use in all different architectural layers such as data centers, client applications and edge devices. The MT is an algorithm that is rate-less meaning that it is possible to set any redundancy level to a specific use case for optimal functionality, and add or reduce the redundancy level without noticeable performance impact when tiering the data from hot to cold storage or vice versa.

Figure 21B:
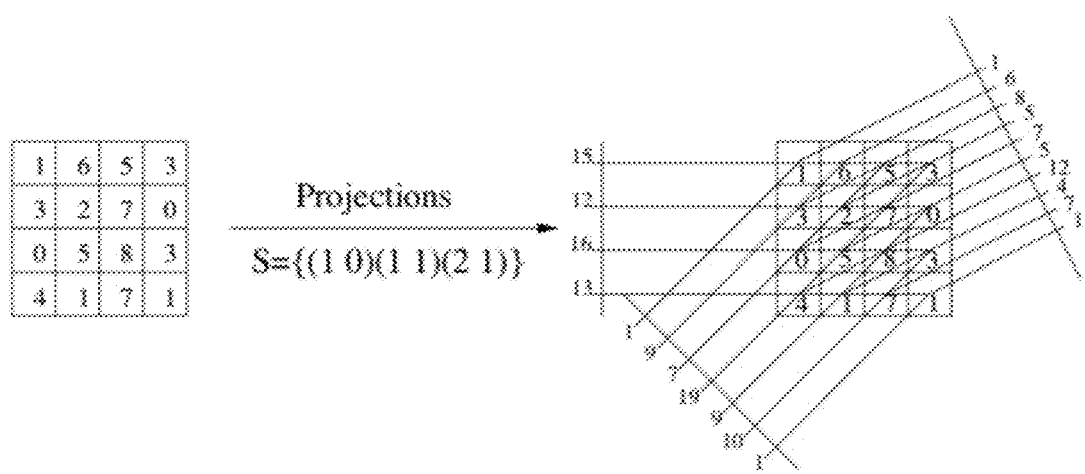
FIG. 21*b* is a graphical illustration of the Mojette Transform algorithm for a 4×4 data block according to exemplary aspects of the present disclosure.

In FIG. 21b a data block 4×4 is transformed into projections $p(1,0)$, $p(1,1)$ and $p(2,1)$ using the MT algorithm in a graphical representation. The projection $p(1.0)$ is a horizontal projection and in the example adding the rows together (15, 12, 16, 13). The next projection is the $p(1,1)$ a 45 degree projection adding together each figure in the 45 degree projection (1, 3+6, 0+2+5, 4+5+7+3, 1+8+0, 7+3, 1) giving the projection $p(1,1)=(1,9,7,19,9,10,1)$.

Figure 21C:
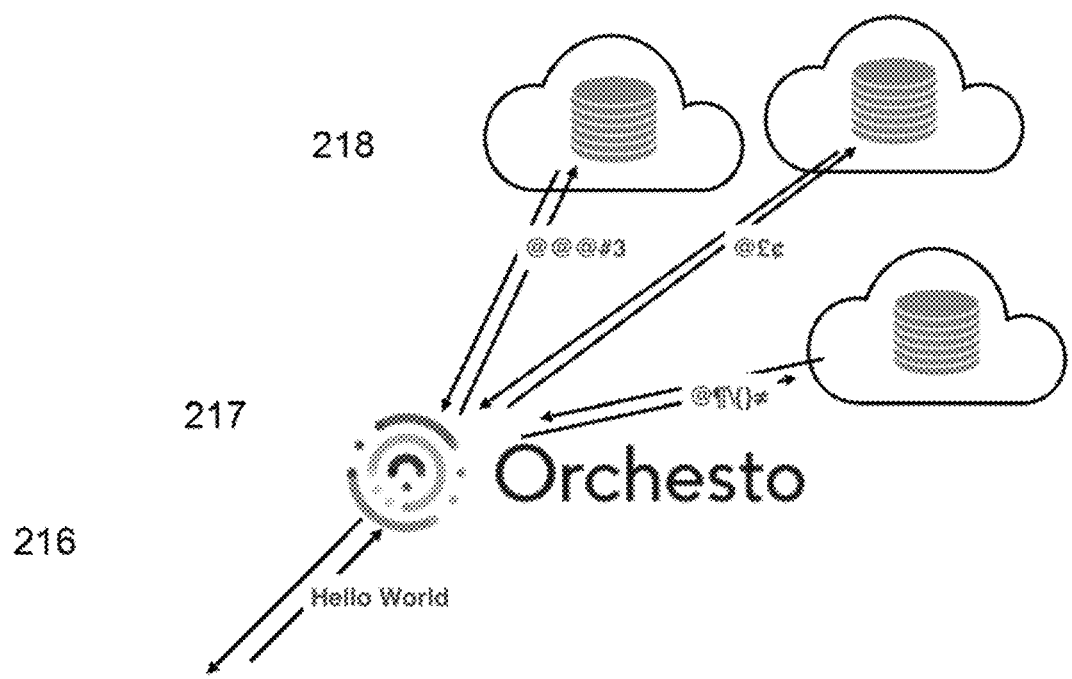
FIG. 21*c* illustrates the zIDA implementation for data placement using the MCDF according to exemplary aspects of the present disclosure.

In FIG. 21c the above MT operations is shown in a real word example. Step 216 sends the data "Hello World" to the GW 217 where the MT operations are performed and three (3) projections are created. In the next step the three different projections are sent to three different cloud providers step 218 the data now being totally secure and unreadable. This example could be a configuration that only needs two projections to decode the object and have one projection for improved availability and/or redundancy. The configuration could also be standard if using high quality cloud providers with all projections needed for the decoding and no extra redundancy projection is created. This is dependent on the use-case with respect to security, performance, flexibility, redundancy and more.

Figure 22A:
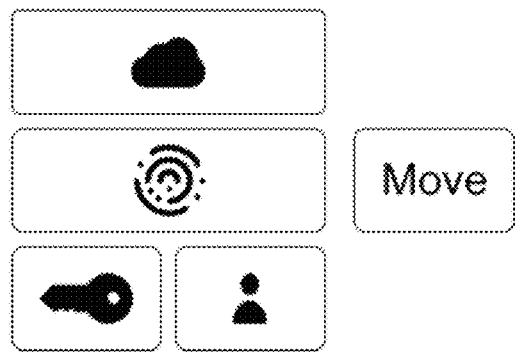
FIG. 22*a* illustrates the Move as a part of the Abstraction layer according to exemplary aspects of the present disclosure.

Both FIG. 22a and FIG. 23 are focused on the data functions inside the abstraction layer making it possible to move or sync data between file systems or cloud providers or vice versa. This feature is important for the first Security Guidance step "Controlling what data goes into the cloud and where" and then later "Enforcing information lifecycle management security" to have a life cycle management and governance of all the information and data stored. Using this move and sync functions in a FIG. 5 automation setup based on storage policies will move data to where it should reside and have the correct security configured. All data maintenance, security, performance and more can be automated based on policies to be executed in the background without any disruption to the users and applications connected to the data over S3/API or Filesystem.

An S3 interface or application can have the possibility to mount a S3 as a filesystem, making it possible for future applications to use familiar interfaces but have the possibility to use the GW to store the data at different CSPs. Technologies like Filesystem in Userspace (FUSE) and API layers translation software like the File System Abstraction Layer (FSAL) for an NFS server, are available as clients or servers to perform this for most operating systems, making also present application use object storage for offloading storage to the cloud together with disaster recovery and backups. Installing a GW on a client computer and then using a FUSE mount, the user of the client computer will have a direct access to all data given by the policies.

Figure 24:
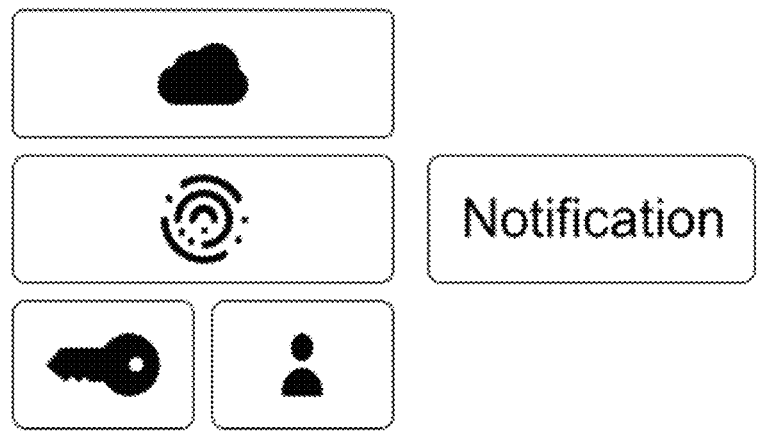
FIG. 24 illustrates the Notification as a part of the Abstraction layer according to exemplary aspects of the present disclosure.

FIG. 24 describes a notification from cloud storage and a new operation is performed. This notification information can be used to trigger new events and automate functions to make compute operations on new objects, or governance policy operations. This could be automated compute functions. For example, when a new picture is placed in a bucket, the notification gives a signal to a policy driven compute operation to prepare a number of transformed pictures that later are placed in the application layer to be shown to users of the application. Compute operations could also be serverless making it possible to have the GW to initiate compute operations on data based on polices, when new data arrives or using other triggers. Cloud providers have many functions available that can be used for lambda or sever-less access/functions from applications. Having the GW to initiate these operations using company policies greatly simplifies and secures data operations.

Figure 25:
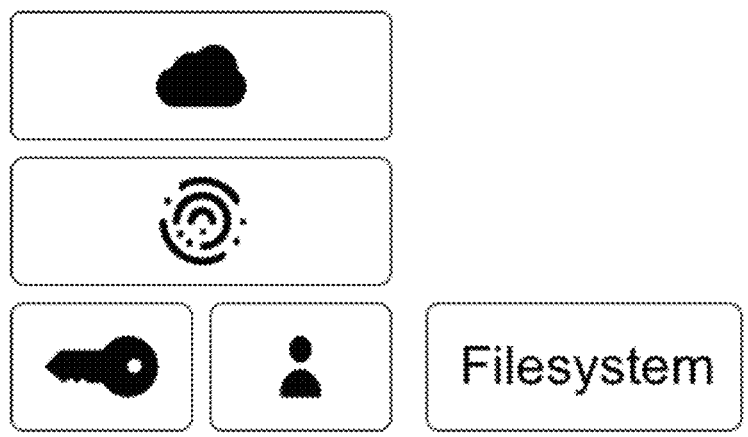
FIG. 25 illustrates the Filesystem as a part of the Users and Applications layer according to exemplary aspects of the present disclosure.

FIG. 25 shows that the filesystem, which the GW is placed upon, will make this visible to the users and application if allowed by the IAM. Filesystem access is high performance and used when low latency and data access is required. The filesystem is also often used in conjunction with an extremely fast cache described in FIG. 30 in high performance use cases like analytics. The filesystem can also be handled out with filesystem storage protocols like the Network File System (NFS) Protocol, the Server Message Block (SMB) Protocol and others to share a storage connection for groups, users or applications. This is further illustrated in FIG. 32a and FIG. 32b. The filesystem access can be either over a direct access to GW configured filesystem or over a mounted/API S3 filesystem depending on use-case and the needed functionality and features of the application. This is further in detail described in FIG. 32b.

Figure 26:
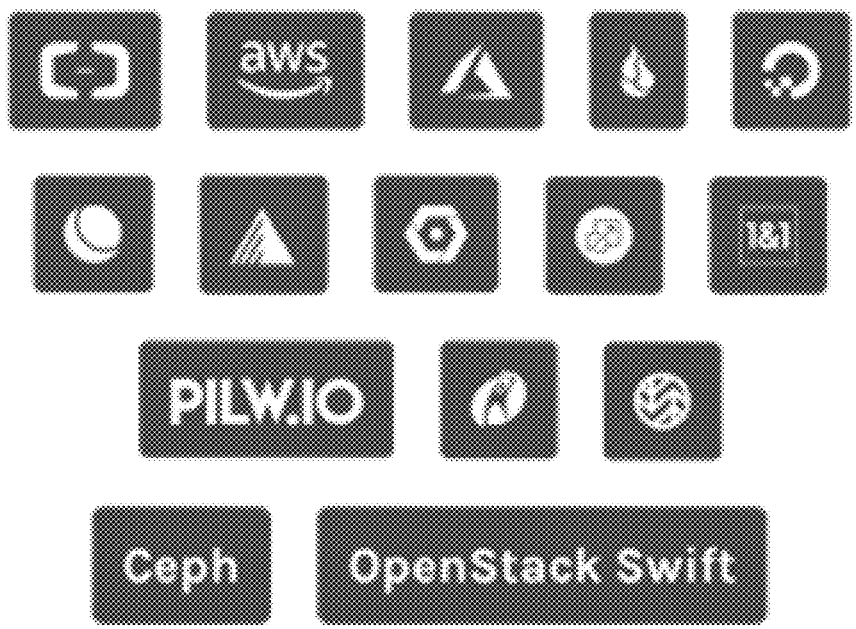
FIG. 26 illustrates the Multi Cloud Storage Providers layer according to exemplary aspects of the present disclosure.

FIG. 26 illustrates the multi cloud storage provider layer that is used to store the objects. There is a possibility to use both public and private clouds as storage backends to the MCDF in hybrid configurations enabling better governance of private and confidential data from a data locality perspective.

Figure 27:
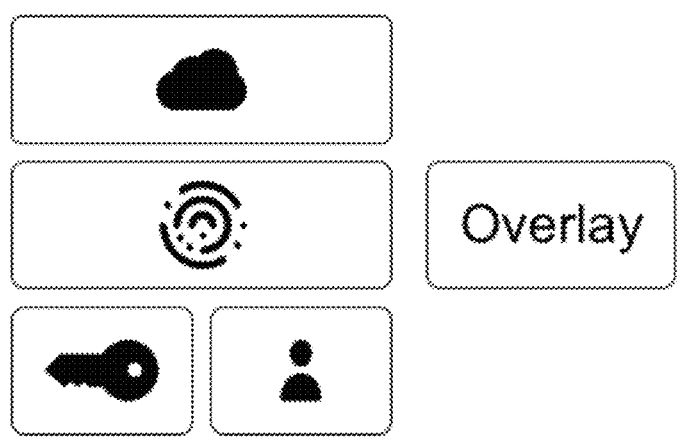
FIG. 27 illustrates the Overlay function as a part of the Abstraction layer according to exemplary aspects of the present disclosure.

FIG. 27 illustrates the overlay functionality of the abstraction layer that is able to show different buckets as one to the user or application when they are physically situated in different locations.

Figure 28:
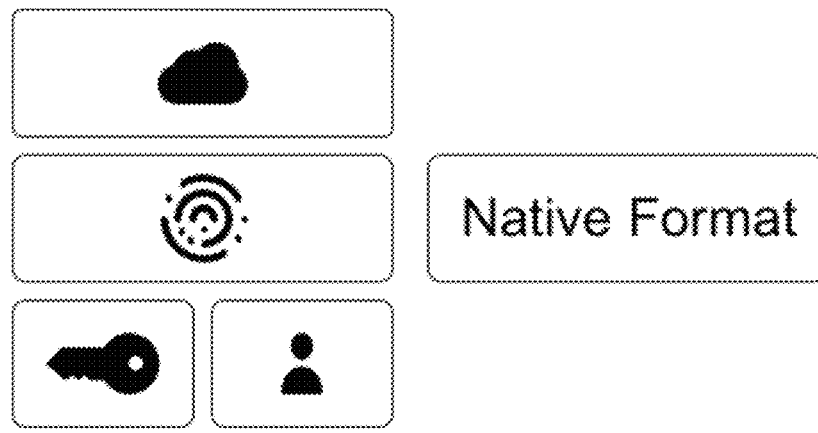
FIG. 28 illustrates the Native format function as a part of the Abstraction layer according to exemplary aspects of the present disclosure.

FIG. 28 shows that the MCDF uses the CSP's native format for objects, making it possible to use all functions inside each cloud provider for operation on the data and to use dedicated software created by each CSP.

Figure 29:
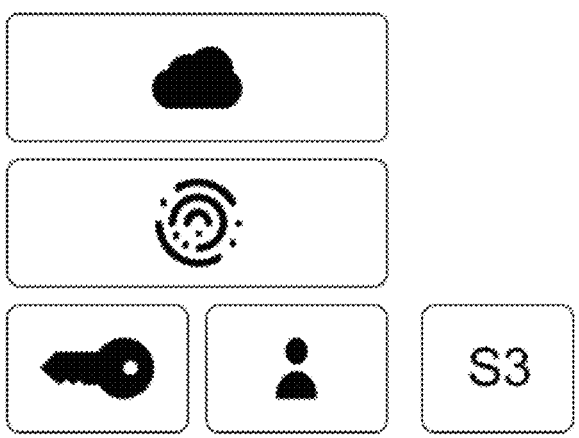
FIG. 29 illustrates the S3 function as a part of the Users and Applications layer according to exemplary aspects of the present disclosure.

FIG. 29 show the verified standard S3 interface to the MCDF that is AWS compatible and possible to be used with software having a S3 interface.

Figure 30:
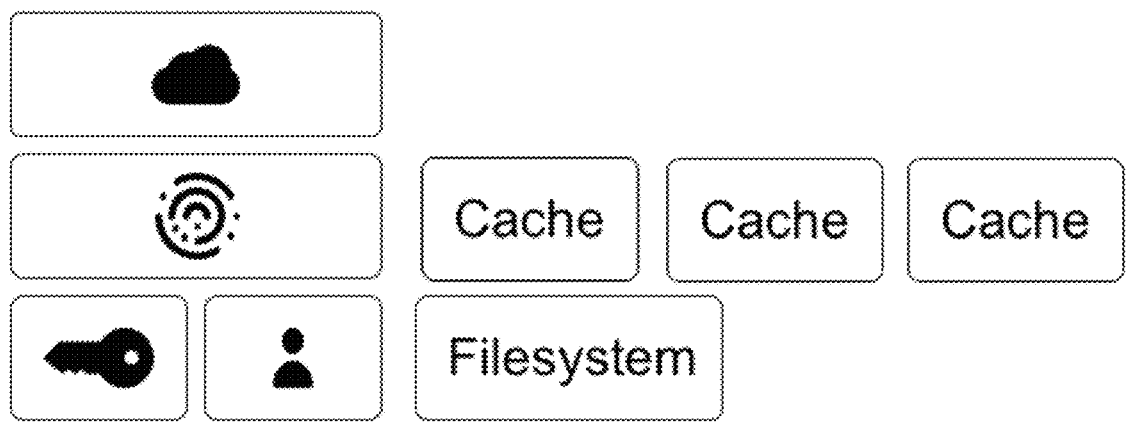
FIG. 30 illustrates the Cache function as a part of the Abstraction layer with access over filesystem and S3 according to exemplary aspects of the present disclosure.

FIG. 30 illustrates the connection from the S3 interface to the local filesystem making it possible to create a local private cloud using standard storage systems like Network Attached Storage (NAS), and standard filesystems containing data.

Figure 31A:
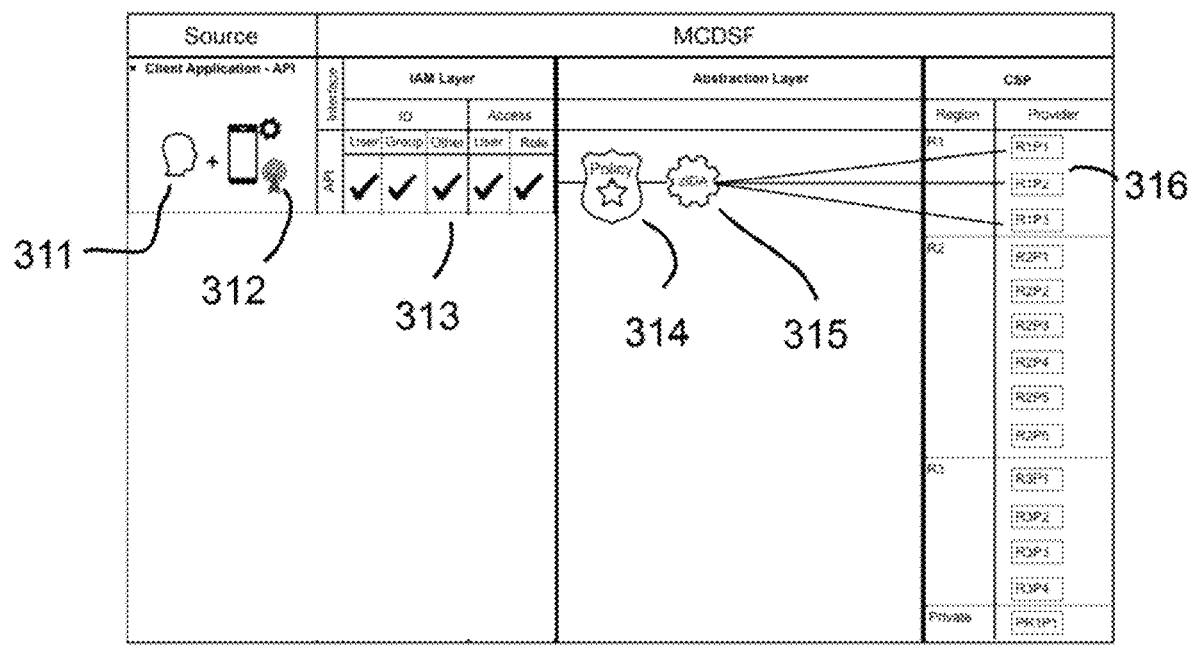
FIG. 31a shows a table of the MCDF for a user having an application that uses the API as an application interface and how the IAM layer and the Abstraction layer are configured using policies and placing data only in region R1 using zIDA according to exemplary aspects of the present disclosure.

FIG. 31a shows an example of a table for the MCDF connection of a client application over API to the GW having connection to the OC for the configuration and the operations in the GW for the IAM layer. Further in the abstraction layer the use of policies and functions are exemplified for the use of zIDA, storing created chunks on CSP in region R1. In step 311 the user logs into the computer with the GW and the application connected over API and communicating with the OC. In step 312, the OC receives the communication from the application. In step 313, the IAM identifies the user and id. All ID that are approved will be granted access and rolled over to the application. Having the access and role for the application set in the step 314 in the abstraction layer gives the application information of how to handle application data. In step 314 this data is processed and in step 315 this information is used for the function zIDA to create in this case three (3) chunks in a configuration with two (2) basic chunks and one (1) extra chunk. The chunks will be placed in region R1 on three (3) different providers in step 316 R1P1, R1P2, R1P3.

Figure 31B:
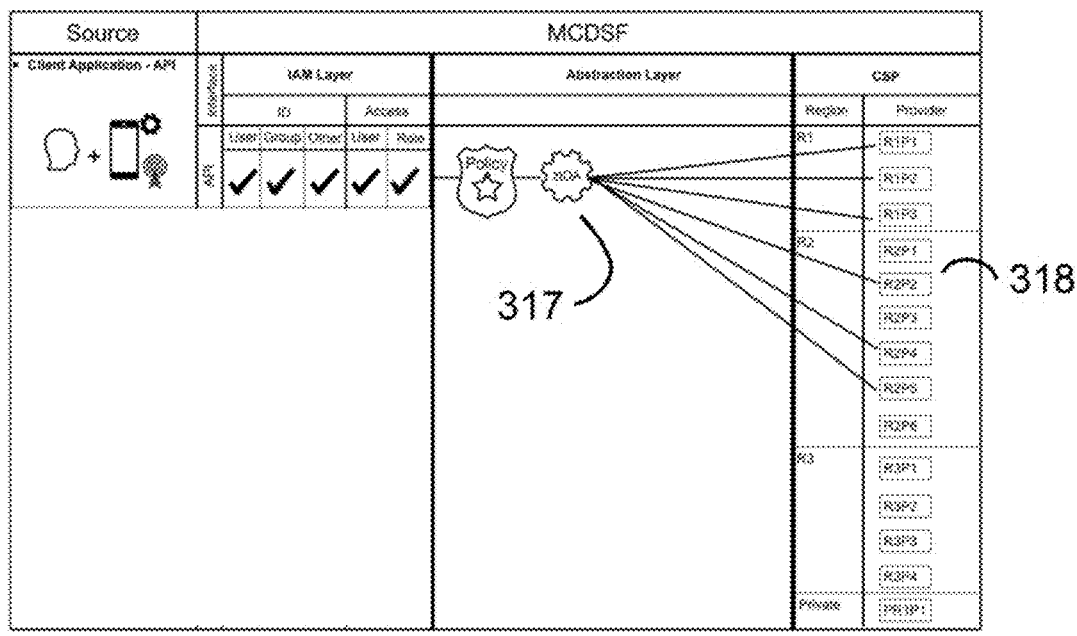
FIG. 31b shows a table of the MCDF for a user having an application that uses the API as an application interface and how the IAM layer and the Abstraction layer are configured using policies and placing data both in region R1 and R2 using zIDA according to exemplary aspects of the present disclosure.

FIG. 31b shows an extension of the in FIG. 31a established configuration having 6 CSPs instead of three (3) and also adding them in a new region step 318 R2, R2P2, R2P4, R2P5. If the configuration is two (2) basic chunks and additional 4 extra chunks, this will make it possible to have high performance access to the data in region R2, using the local two (2) and one (1) extra chunk. When this extra information is no more needed in region R2 all the chunks in region R2 can be removed and only the region R1 chunks will remain. The client application can read (number of basic chunks+1) and decode the data when the number of basic chunks is received. The client application can write (number of basic chunks+1) and when basic chunks are confirmed relax the additional writes of chunks to background work. Establishing a race condition for both read and write operation in zIDA will mitigate latency problems over congested Internet and network connections. If zIDA chunks are placed on different CSPs, this is a very high performance data security when an intruder must obtain data from at least in this example two CSPs before being able to start decoding the information. For further increased security the zIDA can be configured for more basic chunks to be produced and be placed over more than one region onto different CSPs.

Figure 31C:
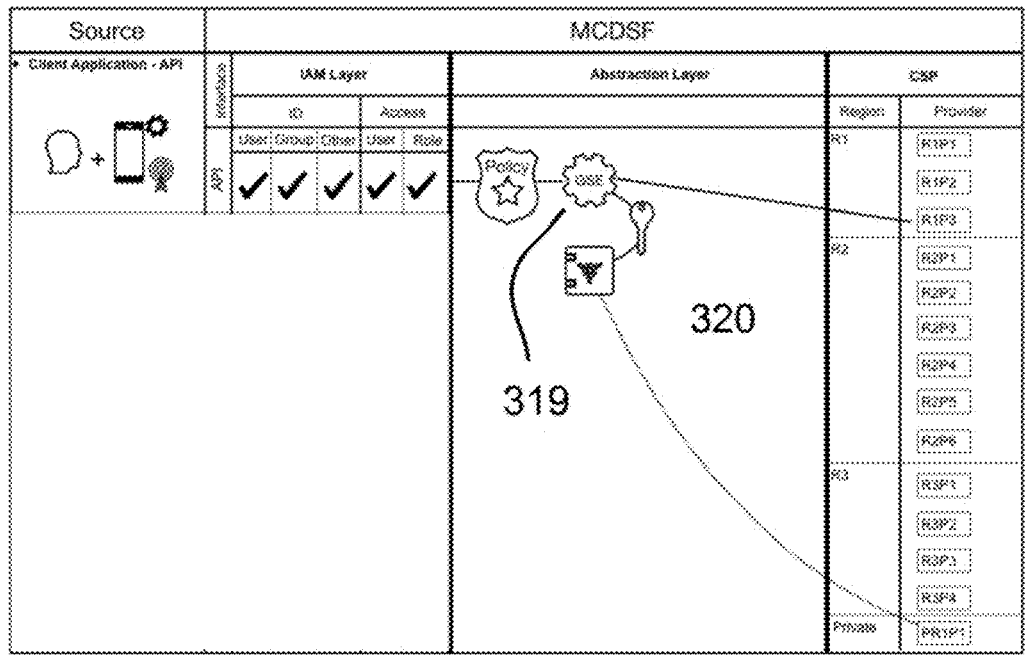
FIG. 31c shows a table of the MCDF for a user having an application that uses the API as an application interface and how the IAM layer and the Abstraction layer are configured using policies and placing data only in region R1 using GSE with key placement in KMS according to exemplary aspects of the present disclosure.
Figure 31D:
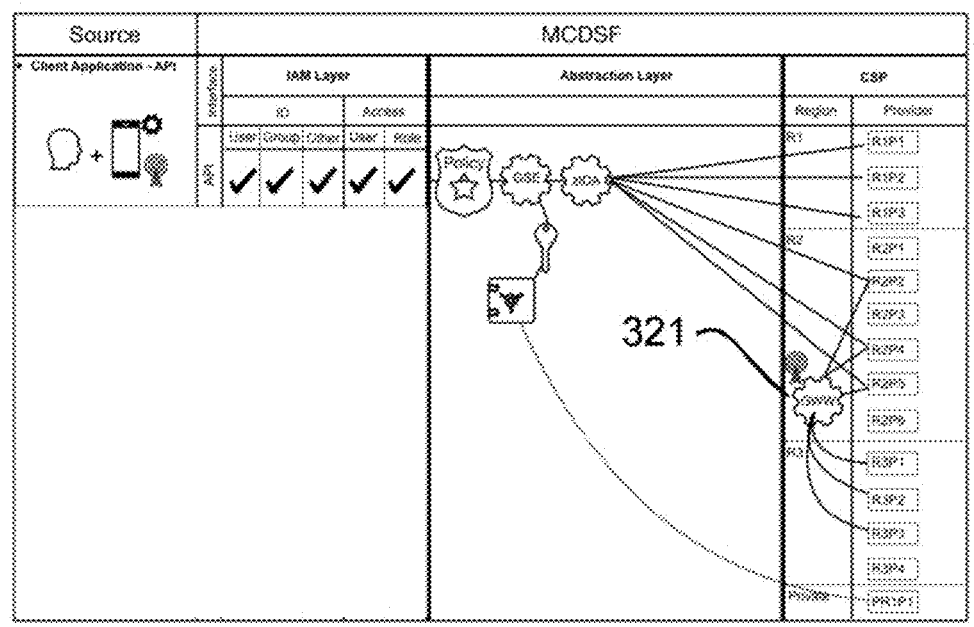
FIG. 31d shows a table of the MCDF for a user having an application that uses the API as an application interface and how the IAM layer and the Abstraction layer are configured using policies and placing data both in regions R1 and R2 using GSE with key placement in KMS with a GWW to perform work between region R2 and R3 according to exemplary aspects of the present disclosure.

In FIG. 31c, an example of using encryption to secure data from external intrusion is configured. The client application is configured and IAM identification of the user is performed over the OC and after successful verification correct access granted for the application over a role policy. The GSE is then configured over a policy for storing the data in region R1 at cloud provider R1P3 with key management system configured to store data in the private cloud PR1P1. This configuration does not share keys with the used CSP together with that the encryption is performed close to the application to create best possible security for private and confidential information. Step 319 is the GSE function within the GW abstraction layer that enables gateway side encryption of the data and places the encrypted data according to the Policy defined by the Role in region R1 onto CSP R1P3. The step 320 is the key management system of the GW inside MCDF that securely handles keys and secrets and may have the storage connected to the private cloud PR1P1.

Using a more sophisticated security setup is described in FIG. 31d, combining both the GSE and the zIDA to first encrypt the data and then create chunks of the data and place this onto different CSPs and store key management data in the private cloud PR1P1 will create high data security storage. A new component of the MCDF is also introduced in region R2 for the synchronization and move of data between region R2 and region R3 over a step 321 Gateway Worker (GWW) that reads data in region R2 for replication into region R3 without affecting client application but instead making this move directly between CSPs. This GWW can also be automated over a rules engine using policies that stipulates boundaries and if the MCDF is working outside these boundaries initiates an action. In this example the latency for read and write of data could be outside the boundary of a policy stipulating that latency for the application x should maximum be y ms, and if not initiate replication of data closer to the client with the application x installed. The administration, management and control of this transport of data are handled by the central (OC) and the client application is non-disrupted by this move of data. The cause of the move of data can include saving costs, legal policies, performance or general governance life cycle data management. The GWW is an OC controlled GW that is used for cloud compute operations and movement of data directly between CSPs for data security, data performance and data governance. If functions is to be performed in another cloud provider, other than the data is stored at, the data normally needs to be moved or replicated for the operation to be successful. In the case that this operation shall be performed on all data and a change of topology should be considered to have the data in the right place from start. Using the build-in sync and move FIG. 22a and FIG. 23, this can be made without disruption to the server or user application and triggered, controlled from the central OC.

Figure 31E:
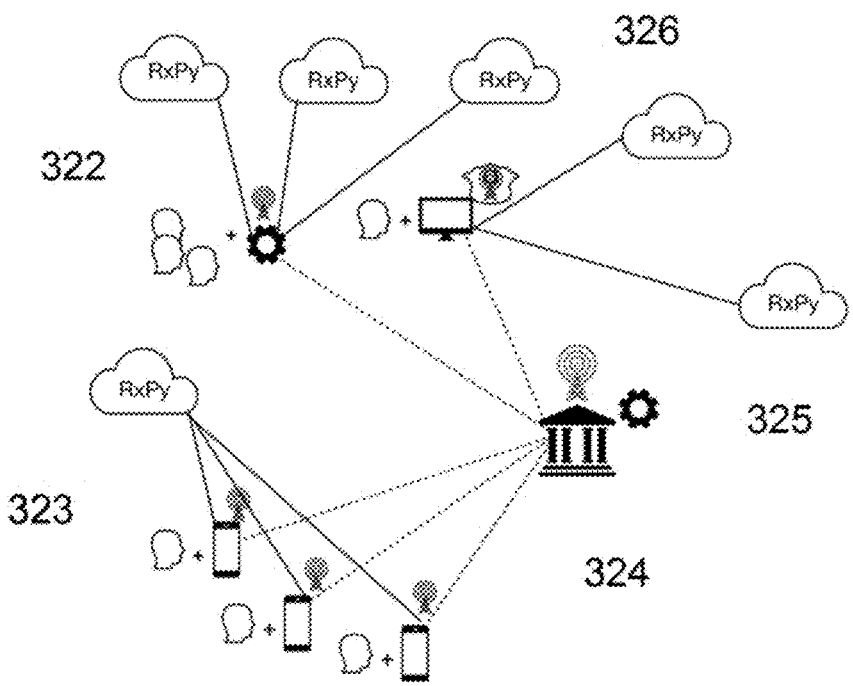
FIG. 31e shows an illustration of a MCDF having different users, groups and other identities (e.g. servers, machines, providers) that is configured, managed and governed by a communication to each gateway providing IAM and storage policies together with management and control for the framework according to exemplary aspects of the present disclosure.

FIG. 31e shows the OC that communicates with all configured GWs and GWWs for management of the MCDF with respect to governing, security and other aspects of the data. In step 322a server application is connected to a GW and communication IAM, policies and more and receives metrics, monitoring information, alerts and more back from the GW. Behind the server multiple users are connected and can be identified over the IAM, and the access is granted based on the ID. The storage policies then stipulate how the data should be handled by the GW and in this example the data is sent to three (3) different clouds. In step 323 single users with an application for collaboration is connected to the OC and the storage policies stipulate that the data should be sent to one common cloud. The OC can control each user access and grant or deny access to specific data in the same manner as if the user where on a filesystem on-premise using the AD or LDAP. Step 324 is the OC and from here the administration and control of the MCDF can be managed and controlled. The OC is in detail described in FIG. 1d and includes a central core with communication interfaces to a web console, message bus to a API interface and interface to different plugins. The OC also incorporates a rules engine that operates onto policies (rules) that is given to the OC of the MCDF to operate within set stipulated boundaries with accompanying actions.

Figure 31F:
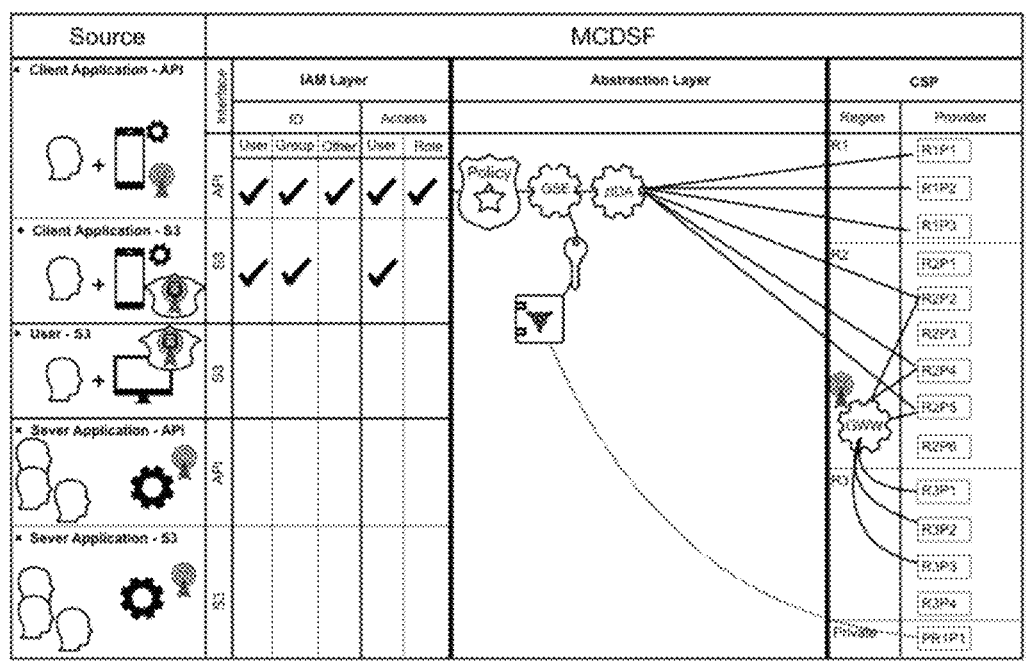
FIG. 31f shows a table of the MCDF with selection of different types of users, groups, roles, interfaces and polices to be configured to use the GW as a MCDF according to exemplary aspects of the present disclosure.

FIG. 31f is a representation of different configurations for configuring the GW, the GWW, and the OC for different types of operating systems, platforms, servers, clients, and over different interfaces. The possibility to use the direct S3 interface or integrate software over API will allow a developer to give value to customers. Creating the abstraction of the actual placement of the data to the configuration over policies to the GW makes it flexible and possible to alter without affecting the application. An IT department can take responsibility for the company CSP's, management and sets policies for governance and the security department can set the data security policies. All polices then act together to best serve the company's total governance framework for data over its lifetime, from customers and users all the way to long time backup storage.

Figures 32A, 32B:
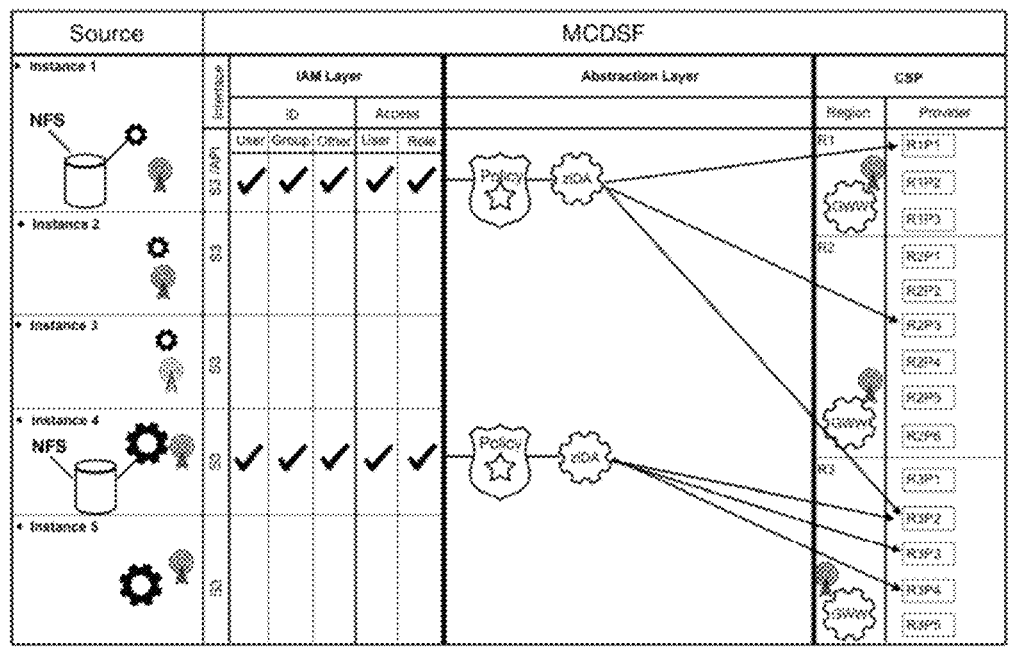
FIG. 32a shows a table of the MCDF with selection of different types of storage integrations using both direct storage access over filesystem protocol (NFS, SMB . . . ) and the S3 interface, together with different polices to be configured to use the GW as a MCDF placing zIDA data in different regions according to exemplary aspects of the present disclosure.
FIG. 32b shows an illustration of storage integrated GWs, configured, controlled and managed by the OC having applications both connected over file system protocol and S3/API to the same data residing both in the cloud and in the storage, governed by the same policies over the OC and GWs according to exemplary aspects of the present disclosure.

FIG. 32a shows a topology where data is accessed both over filesystem with a storage protocol and S3 interface. For example. FIG. 31a shows that the filesystem interface is done over a file storage protocol such as the NFS. The filesystem can be a Network Attached Storage NAS capable of serving both the NFS and the SMB to future clients and applications. The filesystem interface can be created in different ways for different purposes and for different usecases. Sharing both a S3 and a future file storage protocol makes it possible to have an application work on both protocols simultaneously or separately depending on the use-case.

Using the MCDF for securing the data in the cloud following the recommendations from "security-guidance-v4" also incorporates moving the data to be in the set proximity to the application to have the application work in the intended way even if the application is moved to another cloud provider or location with the same provider. The table below shows how the MCDF will ensure cloud data security.

TABLE

Cloud Data Security MCDF

| No | Cloud Data Security | | MCDF function |
|---|---|---|---|
| 1 | Controlling what data goes into the cloud and where | | Storage Policy - CSP configuration |
| 2 | Protecting and managing the data in the cloud | | |
| 3 | | Access controls | IAM - Access policies |
| 4 | | Encryption and zIDA | GSE, zIDA - Security policies |
| 5 | | Architecture | Application close GW + OC |
| 6 | | Monitoring/ alerting | OC to monitoring multiple GW and GWW |
| 7 | | Additional controls | OC automation over analytics on logs, metrics |
| 8 | Enforcing information lifecycle management security | | |
| 9 | | Managing data location/ residency | Governance policy - Data life cycle management |
| 10 | | Ensuring compliance | Governance policy - Compliance |
| 11 | | Backups and business continuity | Governance policy - Data DR, BU |

Using the MCDF for securing cloud data starting with step 1 in Table: Cloud Data Security MCDF, Controlling what data goes into the cloud and what storage policies are being used for CSP. Each storage provider has been investigated beforehand and the accompany contract established to be used as the paying account. The first step is to have the user, group and other identity (e.g. role, application, machine) log into the GW with the required credentials. The user is registered over the OC either from an external directory or directly registered in the OC by an administrator of the OC with the correct credentials. The basic configuration of the GW is given by the administrator that will give a user access to CSP and features depending on the privileges given to the user. The user can then set and configure the application to use approved CSP backends and set security features using security features to the data storage together with governance policies. Policies outside of governing company policies for the user, application, and machine will not be set by the user. If a user wants to create something outside of the approved settings, the user must get in contact with the responsible persons inside the company to make a change to the governing policies. Once the policy is accepted it is verified that the data will be stored at the specified CSP having an approved contract with the company over the storage policies given for storing the generated data from the user or application.

In step 2 "Protecting and managing the data", in the cloud first security measurement is to step. 3 "Access controls" using the IAM to verify first the user or application. If the user or application is approved, the user or application is given access rights using security policies set by an administrator using company information. By default everything is denied using the IAM and access needs to be granted to the user/application.

In step. 4 "Encryption and zIDA" is to set a security policy to the data using the GW functions GSE and/or zIDA for the protection of the data both in-flight and when in stable storage at the CSP or on-premise storage. The key for the encryption is stored in a vault such as a Key Management System (KMS) separated from the CSP and shares nothing with the cloud.

In step 5 "Architecture" is a very important point to have security from point of data generation to stable storage at CSP with full security features set application close where the data is generated. Having an architecture where the data protection takes place in direct connection with the application makes it much more secure, reducing the risk during the transport from the client to the CSP over internet and untrusted networks. From the OC all problems from client GW will be seen and detected. The OC also can correct security risks after alerts and define new altered security policies for the gateway if necessary to correct a security problem.

In step 6 "Monitoring/alerting" is recommended from Cloud Security Alliance. This is done by the OC using logs and metrics from the connected GW. The alerting can be automatic or manual at login to the OC.

In step 7 "Additional controls" also are given by connected CSP information and on-premise systems for full information of status.

Next major step 8 is to "Enforcing information lifecycle management security". In step 9 "Managing data location/residency" is managed using a Storage Governance policy that sets rules for where the data should be located based on different parameters like time, legal, cost, usage patterns, performance and more. One of the governance polices is also a data lifecycle management policy to handle everything from creation of data of a certain type to end of active data life to the long term backup/storage.

In step 10 "Ensuring compliance" is handled in the MCDF by a policy recognizing tagged data or directly associated metadata and then using a governance policy for compliance to store data subject to legal compliance or other compliance based on specific rules that makes it possible during a compliance audit investigate the correct data being in compliance with rules and regulations. Compliance rules can here be GDPR and similar legislations affecting the possibility to remove or verify consistency, that data has not been tampered.

In Step 11 "Backups and business continuity" is important for safeguarding that business can continue after a serious disaster to buildings or infrastructures. Having a governance policy for data disaster recovery (DR) DR and back up (BU) is important and should specify where data for DR and BU should be placed as well as a policy to verify that both the DR and BU work as intended in the specified DR/BU location.

TABLE

Cloud Data Proximity MCDF

| No | Action | MCDF action |
|---|---|---|
| 1 | New | # Example new application |
|   |   | Create storage policies |
| 2 | Move | # Moving application to new cloud |
|   |   | Identify where the application moved to |
|   |   | Identify closest configured CSP to the new location of application |
|   |   | Verify no conflict to policies for the move of data to new location |
|   |   | If verification ok start move of data to new location |
| 3 | Scale | # Scaling application over multiple clouds |
|   |   | Identify to where the application is scaled |
|   |   | Identify closest configured CSP's to the new location(s) of application |
|   |   | Verify no conflict to policies for the scaling of data to new location(s) |
|   |   | If verification ok start scaling of data to new location(s) |
| 4 | De-scale | # Application is limiting itself to one region |
|   |   | Receive input about what region(s) that will remain |
|   |   | Identify regions that will be removed |
|   |   | Verify no conflict to policies for the removal of data |
|   |   | Run Governance policy removal of data to ensure that no data is lost during the removal of data from different regions and CSP. |
| 5 | Remove | # Final remove of data |
|   |   | Receive information about what data will be removed |
|   |   | Identify data that is set to be removed |
|   |   | Get verification that the data shall be removed |
|   |   | Run Governance policy REMOVE data |

Table: Cloud Data Proximity MCDF shows some operations on data that can be performed using different preconfigured verified policies for different actions. In examples having to change locality of the data to have better proximity between the data and the application this can be done by geo-location data both from the application and the CSP locations and match the best pattern for users and placement of data to best match all given Storage policies. The action to sync or move data can also be triggered by different metrics or log events such as latency to read and write data, bandwidth, IO performance, costs, security events and more. Using machine learning to best determine placement of data will make it possible to automate to a great extent all change of data placement. Using this in platforms like Kubernetes and Openstack will make it possible to have data following applications that run in multi-cloud setups both when scaling, and down scaling and at all time keep the data secure and private over the GW's controlled by the OC using policies, governed and maintained by the organization.

FIG. 33 illustrates a move of data between different clouds having data in separate clouds away from where applications run. This topology uses the GW as an abstraction layer in-between the application 334 and the cloud storage 338, and makes it possible to move data between clouds without the application being affected. A move of filesystem data from one instance 339 to another similar instance over a GW is simplified using S3 interface over Internet to another GW all configured over the OC 331. For a cloud native application a move of data or making data available in a new cloud location is possible making multiple instances like step 339 at different cloud providers step 337 using polices to secure the data access at cloud storage providers 338. No data is transported over the OC 331 only configurations and policies for storage, security, IAM, governance, using API interface to respective GW or GWW in the topology. The application 334 can be of any kind having multiple users and interfaces having the data communicated to the GW using S3/API interfaces or on filesystem and filesystem protocols giving direct access to underlying filesystem.

FIG. 33 shows that a data center uses both on-premise data storage and a secure way offload to the cloud for older data but still make fully available to the customer in a non-disruptive way to the application/role/user. Also for DR and BU this can be automated over the GW 336 using the OC 331 sending the data to a specific location in cloud 338. The cache 333 can be configured as a redundant cache for both read and writes using the Mojette Transform greatly improving performance, redundancy and securing application availability. Also costs will be reduced having a redundant cache when losing the cache in many cases means re-syncing all data generating egress costs by many cloud storage providers that will never happen if the cache is redundant. A local cloud 335 could also be connected to the setup work storage of specific type of data configured by using a policy.

Figures 35, 36:
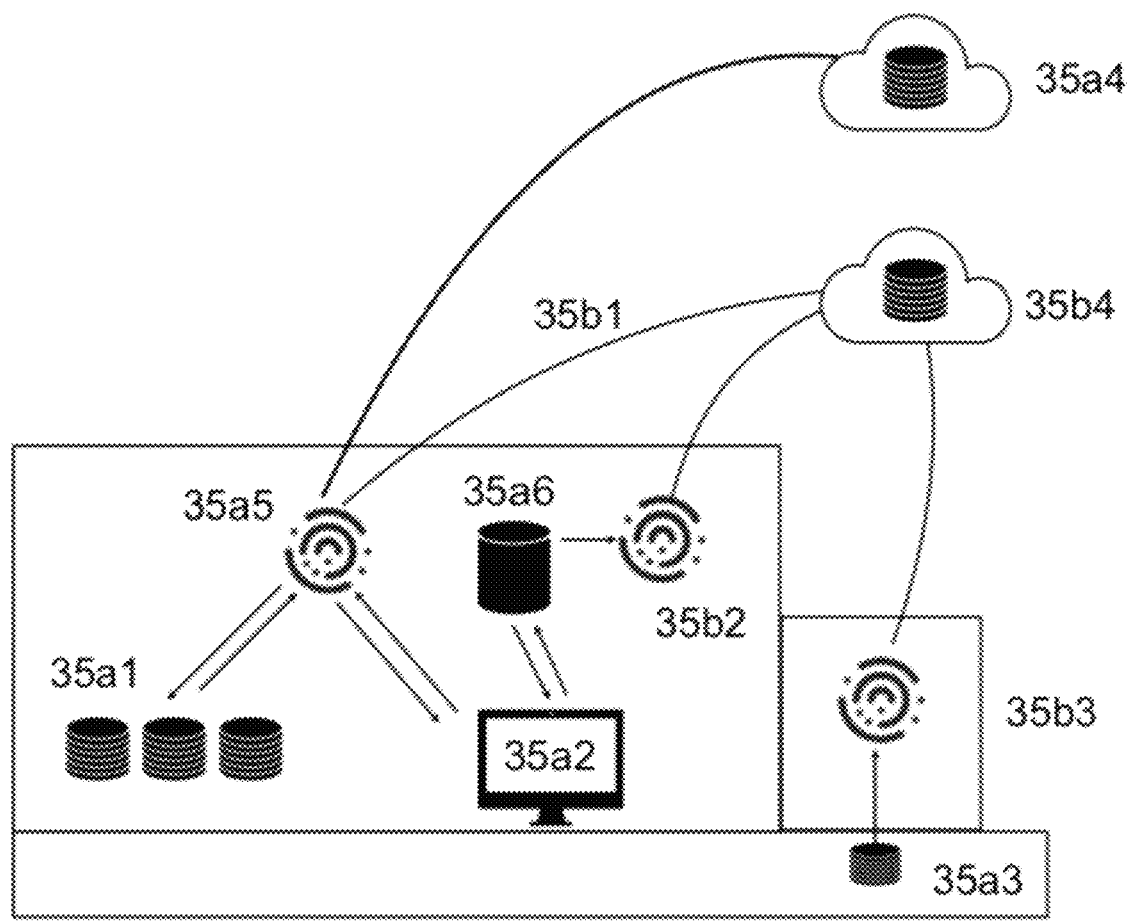
FIG. 35 shows an example of an application on an infrastructure using connected storage and database, with GW's handling both data transfer and backup operations according to exemplary aspects of the present disclosure.
FIG. 36 shows an illustrative example of a generic configuration of a GW, for creating a backup repository on "server-url/bucket" according to exemplary aspects of the present disclosure.

As an example for porting of an application with associated data there is in FIG. 35 a client 35*a*2 hosted and connected to a database 35*a*6 and a GW 35*a*5. The GW 35*a*5 is further connected to a CSP 35*a*4 for the actual data and to a second CSP 35*b*4 over a GW configuration 35*b*1 for backup purposes. The GW 35*a*5 is also configured and connected to cache disks 35*a*1 for performance and cost reasons. The database 35*a*6 is connected to GW 35*b*2 for backup purposes of the database 35*a*6 to CSP 35*b*4.

Having above the application data configured for backup and protection also the basic configurations and data needs to be protected by backup to enable the possibility for disaster recovery or move to another CSP. The GW 35*b*3 here illustrates the backup of the resources and infrastructure configurations.

Resources is normally referred to as CSP's storage and compute as virtual machines or platforms, but could also be services offered by the CSP's in the form of information or connection to databases. An example of service of interests connected as a resource could here be to enrich the metadata of objects handled by the client on the fly through a GW using a CSP's functionality in this respect or using a serverless lambda function connected to the GW. Software that extracts metadata out of most types of files that can be incorporated as metadata into the object, making it easier to search and perform analytics on the saved data.

Examples of the data that needs to be backed up depends on how the client and database is hosted. For stateless applications that hold no data, only the configurations needs to be configured for backup, but for stateful applications like a full virtualized server the virtual disk image 35*a*3 would be needed not to lose any information.

The GW 35b3 makes necessary backups of resources, illustrated by the infrastructure disk 35a3 to the backup Cloud Service Provider 35b4.

In FIG. 36 a configuration over terminal of a GW is illustrated using a CSP at the location s3:s3:server-url/bucket-name for backups with the associated access keys and secrets In FIG. 37 the configuration in FIG. 36 is used to make a backup of the data in folder/your/folder and then also showing the result of the snapshot produced in the created repository on CSP at the location s3:s3:server-url/bucket-name.

Figures 40, 41, 42:
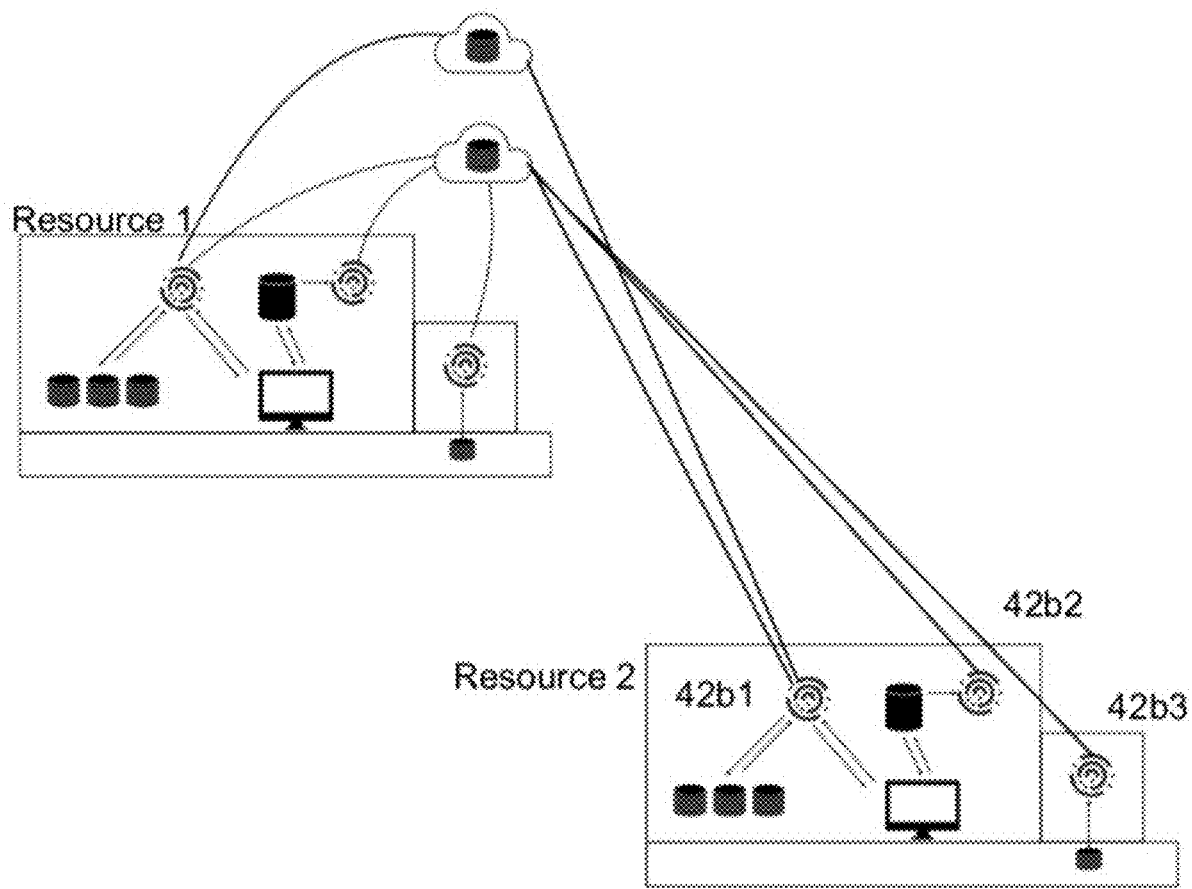
FIG. 40 shows the initialization (apply) of the scheduling of snapshots to be performed by the GW on a Kubernetes platform according to exemplary aspects of the present disclosure.
FIG. 41 shows the snapshots performed, on the clients, together with the associated data performed by the GW, using the set scheduling of snapshots according to exemplary aspects of the present disclosure.
FIG. 42 shows the move of clients and associated data using multiple GW's, including the application code, database and data from CSP1 (Resource 1) to CSP2 (Resource 2), and applying chosen data snapshot of application, database and infrastructure to CSP2 before connecting to the CSP hosting the data according to exemplary aspects of the present disclosure.

For different compute environments the configuration and backup configuration will change, in FIG. 38 shows an example In FIG. 39 an example of the backup scheduling of snapshots and full backup configuration is illustrated and in FIG. 40 the configured schedule is applied. In FIG. 41 the snapshots of the Kubernetes environment are shown as daily-*snapshots in accordance with the configuration in FIG. 39.

Figure 22B:
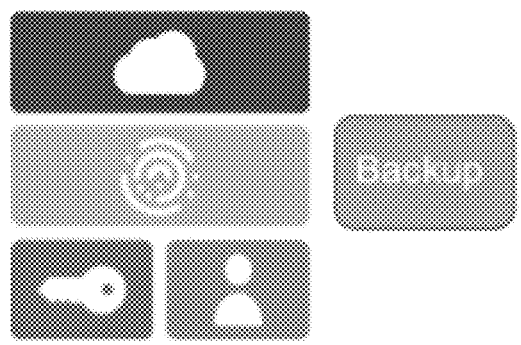
FIG. 22*b* illustrates the Backup as a part of the Abstraction layer according to exemplary aspects of the present disclosure.

FIG. 42 will be used to illustrate a full move of client with associated data from Resource 1 to Resource 2 using infrastructure and data of the backups created in FIG. 35 using the GW function Backup FIG. 22b managed by Central OC FIG. 1 001a or 001b depending on the user of the central. The MCDF Central OC FIG. 1 001 will be used to execute the port from Resource 1 to Resource 2 using a Workflow. First step to prepare for the port to FIG. 42 Resource 2 using the MCDF Central is to configure the resources on the new instance. These resources that will be provisioned on Resource 2 are in FIG. 35 a disk storage 35a3 compute instances for GW's identical to 35b2, 35b3, 35a5 together with compute instances for clients 35a2, 35a6 and cache disks 35a1.

The Resource 2 will after this configuration of resources at Resource 2 have the identical capabilities as the infrastructure of Resource 1 making no need for manual adjustments to fit to the new Resource. There are also different types of move, hot, warm and cold where hot is moving the client when the client is in operation and warm is to restore from a snapshot. The cold restore is a restore without time constraints from data at rest.

The restore here making use of the Central FIG. 1 001 will be a warm restore of the operations hosted on Resource 1 ported to Resource 2. Porting from Resource 1 to Resource 2 could be due to several reasons like cost, legal implications, performance and other causes making it necessary to change the location for everything associated with an application and not only the Resource 1 data FIG. 35 35a4. The first step of porting to Resource 2 will be to identify the backup snapshot to be used in the Central FIG. 1 001, the snapshot of FIG. 35 35a3 will then be connected to at FIG. 35 35b4 and downloaded to the GW and disk FIG. 42 42b3. When this download is finalized all resources can be started in a non configured state to prepare for the next step in porting resources from Resource 1 to Resource 2. The GW's connected to the database (FIG. 35 35a6) and the client (FIG. 35 35a2) FIGS. 35 35b2 and 35a5 can now be connected to the snapshot backups of data at the CSP FIG. 35 35b4 to restore specified snapshot of the database and client configurations using the GW FIG. 42 42b2. The cache devices FIG. 35 35a1 can now also be connected to GW FIG. 42 42b1 on Resource 2.

The workflow can now be set to make a final check of the new setup before connecting to the actual data stored at CSP FIG. 35 35a4. If quality check is approved the GW FIG. 42 42b1 is connected to the data storage at CSP FIG. 35 35a4 and all resources are now live on Resource 2. In the workflow consideration must be taken if the Resource 1 should be alive during the port from Resource 1 to Resource 2, when this could have implications on data processed during the transfer process.

A full copy of the FIG. 35 Resource 1 installation is now established on Resource 2 having all data present at the time of snapshot taken. Normally the last step of the workflow would be to make a snapshot from the new location and then take the new Resource 2 installation into operation.

There is a great need for an improved multi-cloud functionality that reduces the complexity for moving between and using different cloud providers' functionality and securing the data and access to the data.

Next the hardware devices that implement the features described herein will be described with reference to FIG. 43. As can be appreciated these descriptions are merely exemplary, and other hardware devices and circuitry can be used to implement the inventive concepts described herein without departing from the scope of this specification.

Figure 43:
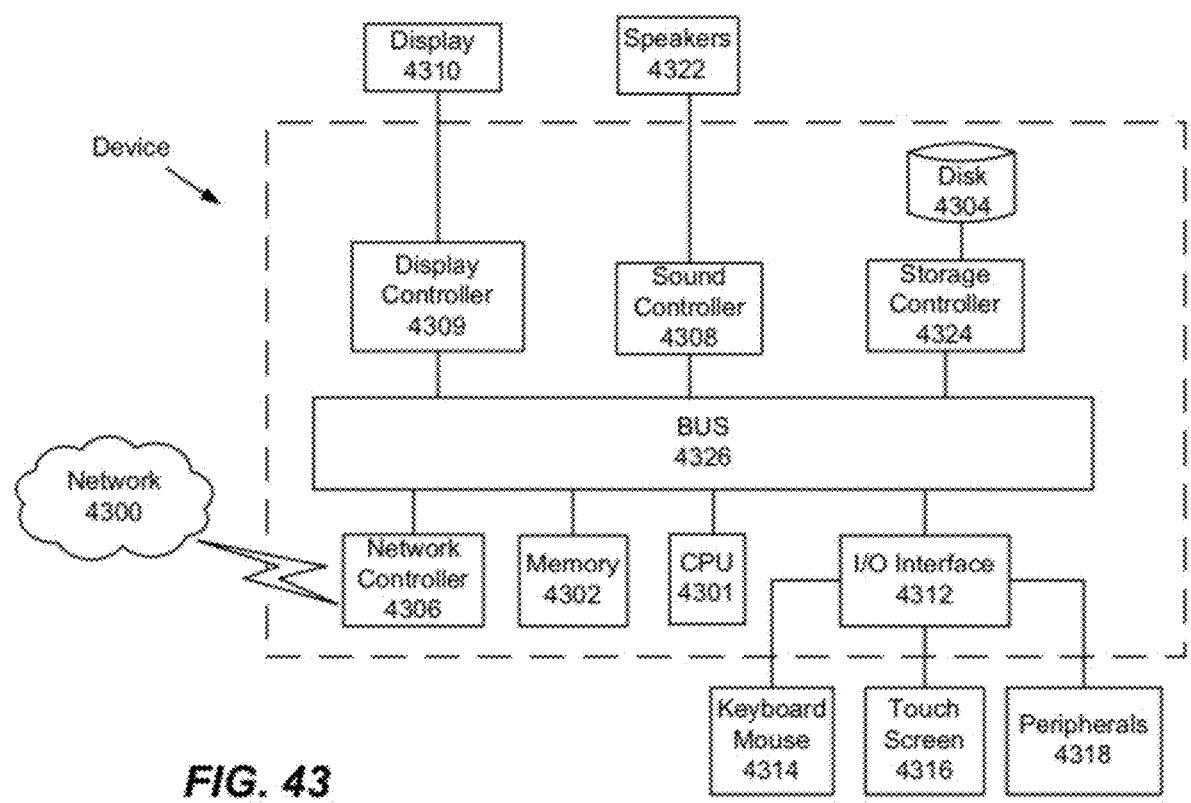
FIG. 43 is a hardware block diagram of a device according to exemplary aspects of the present disclosure.

In FIG. 43, the device includes a CPU 4301 which performs the processes described above/below. The process data and instructions may be stored in memory 4302. These processes and instructions may also be stored on a storage medium disk 4304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the [device] communicates, such as a server or computer.

Further, the claimed advancements may be provided as a utility application, background daemon, or component of an operating system, or combination thereof, executing in conjunction with CPU 4301 and an operating system such as Microsoft Windows 7, UNIX, Solaris, LINUX, Apple MAC-OS and other systems known to those skilled in the art.

The hardware elements in order to achieve the device may be realized by various circuitry elements, known to those skilled in the art. For example, CPU 4301 may be a Xenon or Core processor from Intel of America or an Opteron processor from AMD of America, or may be other processor types that would be recognized by one of ordinary skill in the art. Alternatively, the CPU 4301 may be implemented on an FPGA, ASIC, PLD or using discrete logic circuits, as one of ordinary skill in the art would recognize. Further, CPU 4301 may be implemented as multiple processors cooperatively working in parallel to perform the instructions of the inventive processes described above.

The device in FIG. 43 also includes a network controller 4306, such as an Intel Ethernet PRO network interface card from Intel Corporation of America, for interfacing with network 4300. As can be appreciated, the network 4300 can be a public network, such as the Internet, or a private network such as an LAN or WAN network, or any combination thereof and can also include PSTN or ISDN sub-networks. The network 4300 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 4308, such as a NVIDIA GeForce GTX or Quadro graphics adaptor from NVIDIA Corporation of America for interfacing with display 4310, such as a Hewlett Packard HPL2445w LCD monitor. A general purpose I/O interface 4312 interfaces with a keyboard and/or mouse 4314 as well as a touch screen panel 4316 on or separate from display 4310. General purpose I/O interface also connects to a variety of peripherals 4318 including printers and scanners, such as an OfficeJet or DeskJet from Hewlett Packard.

A sound controller 4320 is also provided in the device, such as Sound Blaster X-Fi Titanium from Creative, to interface with speakers/microphone 4322 thereby providing sounds and/or music.

The general purpose storage controller 4324 connects the storage medium disk 4304 with communication bus 4326, which may be an ISA, EISA, VESA, PCI, or similar, for interconnecting all of the components of the device. A description of the general features and functionality of the display 4310, keyboard and/or mouse 4314, as well as the display controller 4308, storage controller 4324, network controller 4306, sound controller 4320, and general purpose I/O interface 4312 is omitted herein for brevity as these features are known.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A multi-cloud data storage system, comprising:
   a plurality of cloud storage servers, each configured to store data;
   a terminal device connected to the plurality of cloud storage servers via a network;
   a gateway connected to the network and configured to intermediate communications between the terminal device and the plurality of cloud storage servers, the gateway including a plurality of virtual storage buckets, each of the plurality of virtual storage buckets having a different data access policy associated therewith, each of the plurality of virtual storage buckets controlling access to data stored therein based on a respective different data access policy; and
   a management server coupled to the network, configured to (i) manage the gateway, and (ii) control the respective different data access policy for each of the virtual storage buckets in the gateway.

2. The multi-cloud data storage system according to claim 1, wherein the plurality of virtual storage buckets in the gateway decouple communication between the plurality of cloud storage servers and the terminal device.

3. The multi-cloud data storage system according to claim 1, wherein the gateway stores data retrieved from at least one of the plurality of cloud storage servers and places the data in at least one of the plurality of virtual storage buckets based on the respective different data access policy associated with the one of the plurality of virtual storage buckets.

4. The multi-cloud data storage system according to claim 3, wherein the gateway releases the data stored in the one of the plurality of virtual storage buckets to the terminal device based on the respective different data access policy associated with the one of the plurality of virtual storage buckets.

5. The multi-cloud data storage system according to claim 1, wherein the terminal device communicates with the gateway via a secure communication channel.

6. The multi-cloud data storage system according to claim 1, wherein the gateway communicates with the plurality of cloud storage servers via a secure communication channel.

7. The multi-cloud data storage system according to claim 1, wherein the terminal device communicates with the plurality of cloud storage servers only through the gateway.

8. The multi-cloud data storage system according to claim 1, wherein the respective different data access policy for each of the plurality of virtual storage buckets denies access to data stored in a respective virtual storage bucket by default.

9. The multi-cloud data storage system according to claim 1, further comprising a second terminal device coupled to the network and configured to communicate with the management server in order to control the respective different data access policy for each of the plurality of virtual storage buckets.

10. The multi-cloud data storage system according to claim 9, wherein the second terminal device is configured to provide a user interface to a user thereof in order to receive instructions from the user for managing the gateway and setting the respective different data access policy of each of the plurality of virtual storage buckets.

11. The multi-cloud data storage system according to claim 1, wherein the respective data access policy for each of the plurality of virtual storage buckets includes at least one of:
   a data portability policy,
   a measure storage latency policy for optimization of geo-positioning of data,
   an application performance boundary policy,
   a cost optimization policy,
   an application security and monitoring policy, and
   a data security policy.

12. The multi-cloud data storage system according to claim 1, wherein the network is a wireless network.

13. The multi-cloud data storage system according to claim 1, wherein the network is a hybrid wired/wireless network.

* * * * *